(12) United States Patent
Yamashita et al.

(10) Patent No.: US 8,938,095 B2
(45) Date of Patent: Jan. 20, 2015

(54) VERIFICATION METHOD, VERIFICATION DEVICE, AND COMPUTER PRODUCT

(71) Applicant: Fujitsu Limited, Kawasaki-shi (JP)

(72) Inventors: Kiyohide Yamashita, Kasuga (JP);
Shuichi Takayama, Fukuoka (JP);
Naoshi Kayashima, Fukuoka (JP);
Akira Miyazaki, Kawasaki (JP);
Hirohisa Naito, Fuchu (JP); Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 13/656,901

(22) Filed: Oct. 22, 2012

(65) Prior Publication Data

US 2013/0156263 A1 Jun. 20, 2013

(30) Foreign Application Priority Data

Dec. 15, 2011 (JP) ................................ 2011-275002

(51) Int. Cl.
*G06K 9/00* (2006.01)
*G06K 9/46* (2006.01)
*H04L 9/32* (2006.01)

(52) U.S. Cl.
USPC ........... 382/103; 382/233; 382/238; 713/176; 713/179; 713/180

(58) Field of Classification Search
None
See application file for complete search history.

(56) References Cited

U.S. PATENT DOCUMENTS

| 2006/0117183 | A1* | 6/2006 | Hatano et al. ................. 713/176 |
| 2007/0061583 | A1* | 3/2007 | Kanatsu et al. ............... 713/176 |
| 2009/0164793 | A1* | 6/2009 | Yoshioka et al. ............. 713/180 |
| 2010/0014668 | A1* | 1/2010 | Yoshioka et al. ............. 380/243 |
| 2011/0302419 | A1* | 12/2011 | Yoshioka et al. ............. 713/179 |

FOREIGN PATENT DOCUMENTS

| JP | 2006-180472 | 7/2006 |
| JP | 2009-152713 | 7/2009 |
| WO | WO 2010/097923 | 9/2010 |

* cited by examiner

*Primary Examiner* — Amara Abdi
(74) *Attorney, Agent, or Firm* — Fujitsu Patent Center

(57) ABSTRACT

A verification device 101 receives extracted and sanitized data 113 that has been sanitized to protect the privacy of person A. The verification device 101, extracts from among MCU-hash storage data 123 and for $MCU_1$ and $MCU_2$ among MCUs obtained by dividing the extracted and sanitized data 113, an $MCU_1$ hash and an $MCU_2$ hash. The verification device 101 generates an $MCU_3$ hash to an $MCU_6$ hash and from the $MCU_1$ hash to the $MCU_6$ hash, generates a JPEG frame hash 125. The verification device 101 then compares a JPEG hash 121 and the JPEG hash 125 to verify the authenticity of the extracted and sanitized data 113.

5 Claims, 24 Drawing Sheets

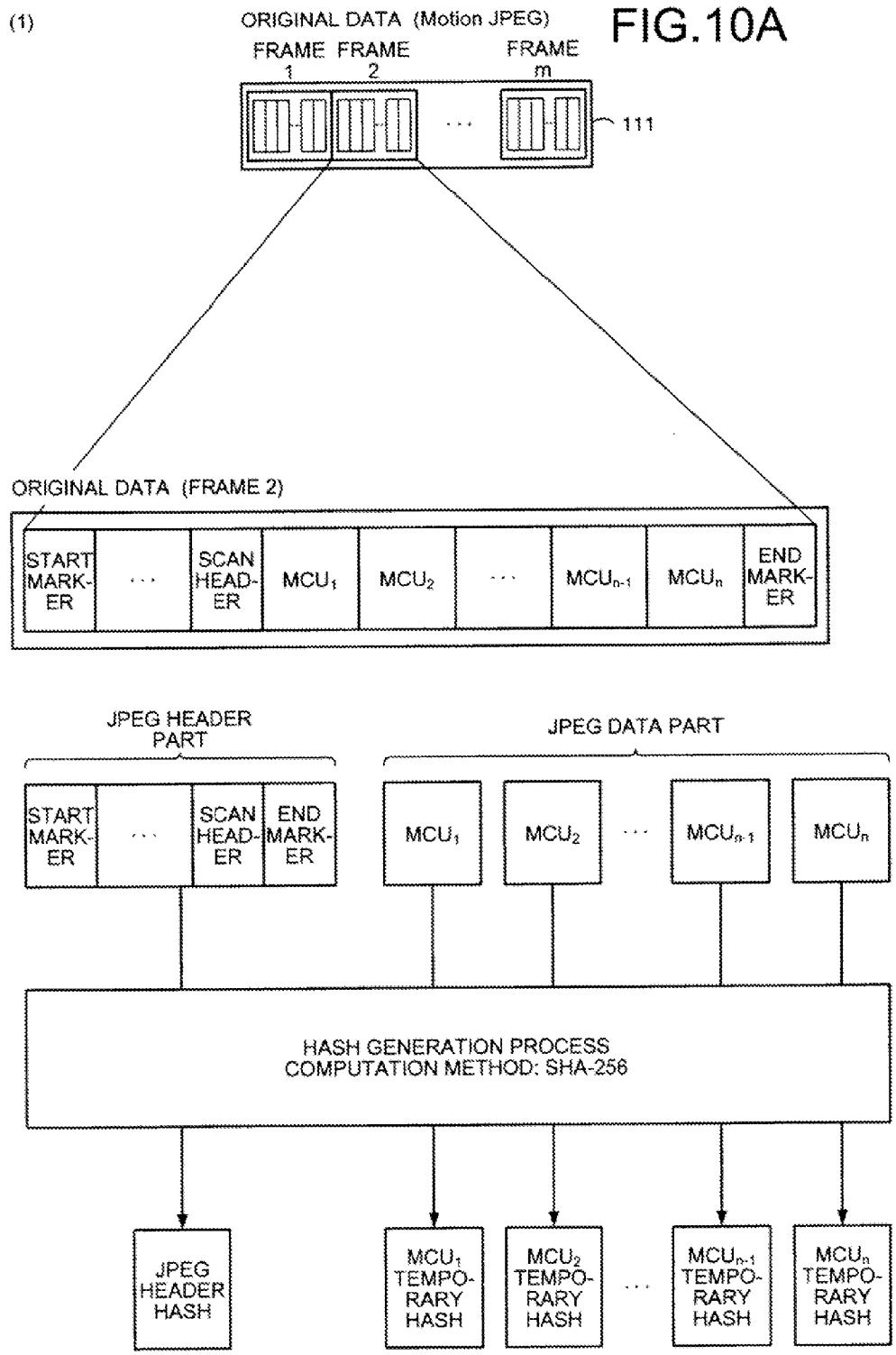

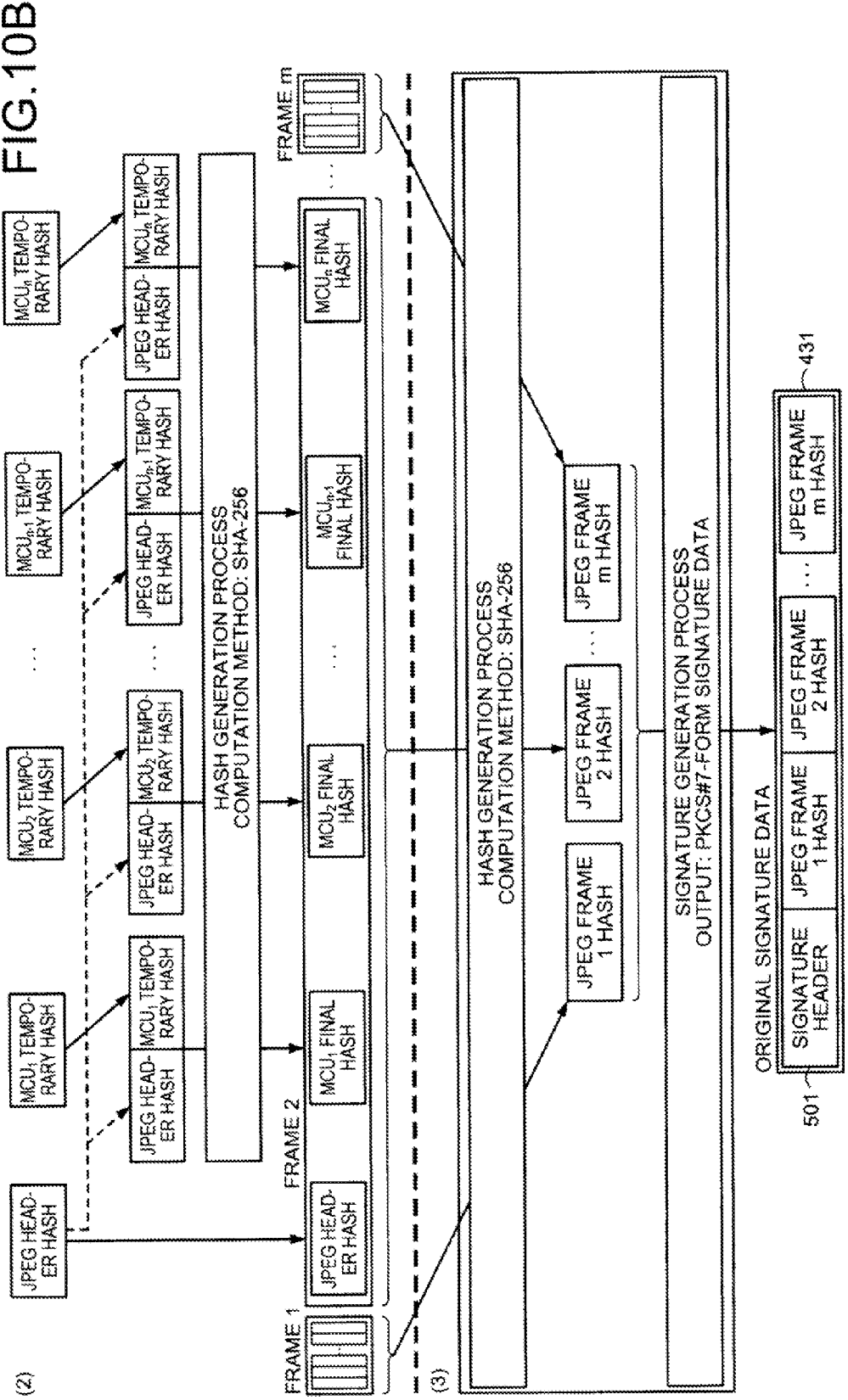

FIG.11

501 {
- SIGNATURE GENERATION ALGORITHM TYPE
- CERTIFICATE DATA
- CERTIFICATE DATA SIZE
- CERTIFICATE PASSWORD
- ORIGINAL DATA
- TOTAL JPEG DATA SIZE
- SIGNED JPEG DATA NUMBER

- JPEG FRAME 1 HASH
- JPEG FRAME 2 HASH
- ...
- JPEG FRAME m HASH

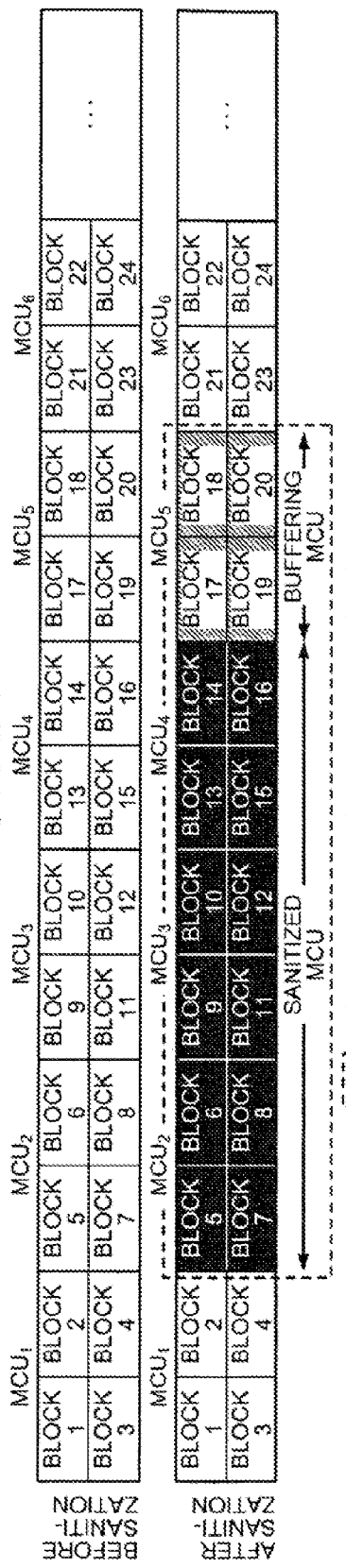

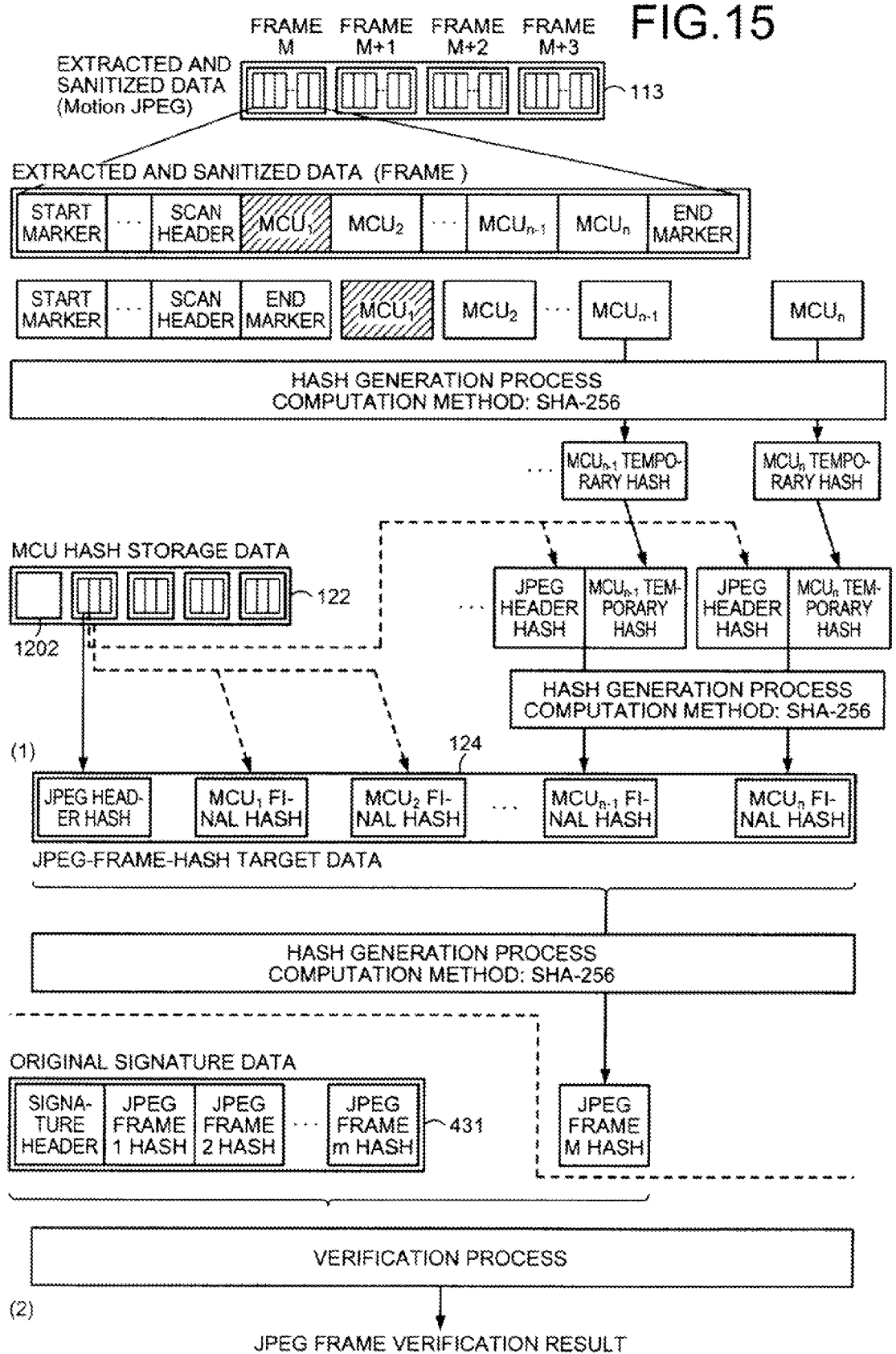

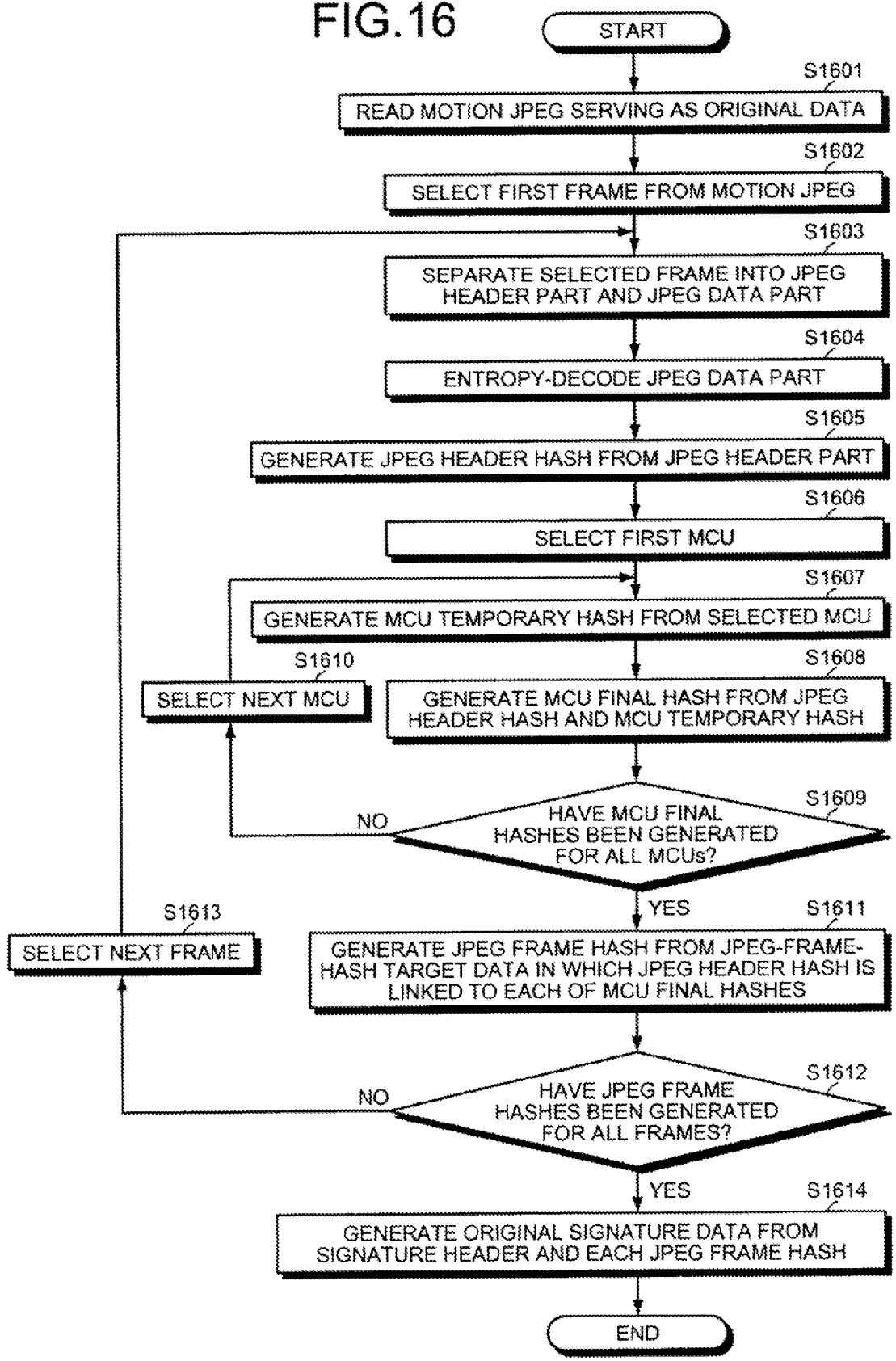

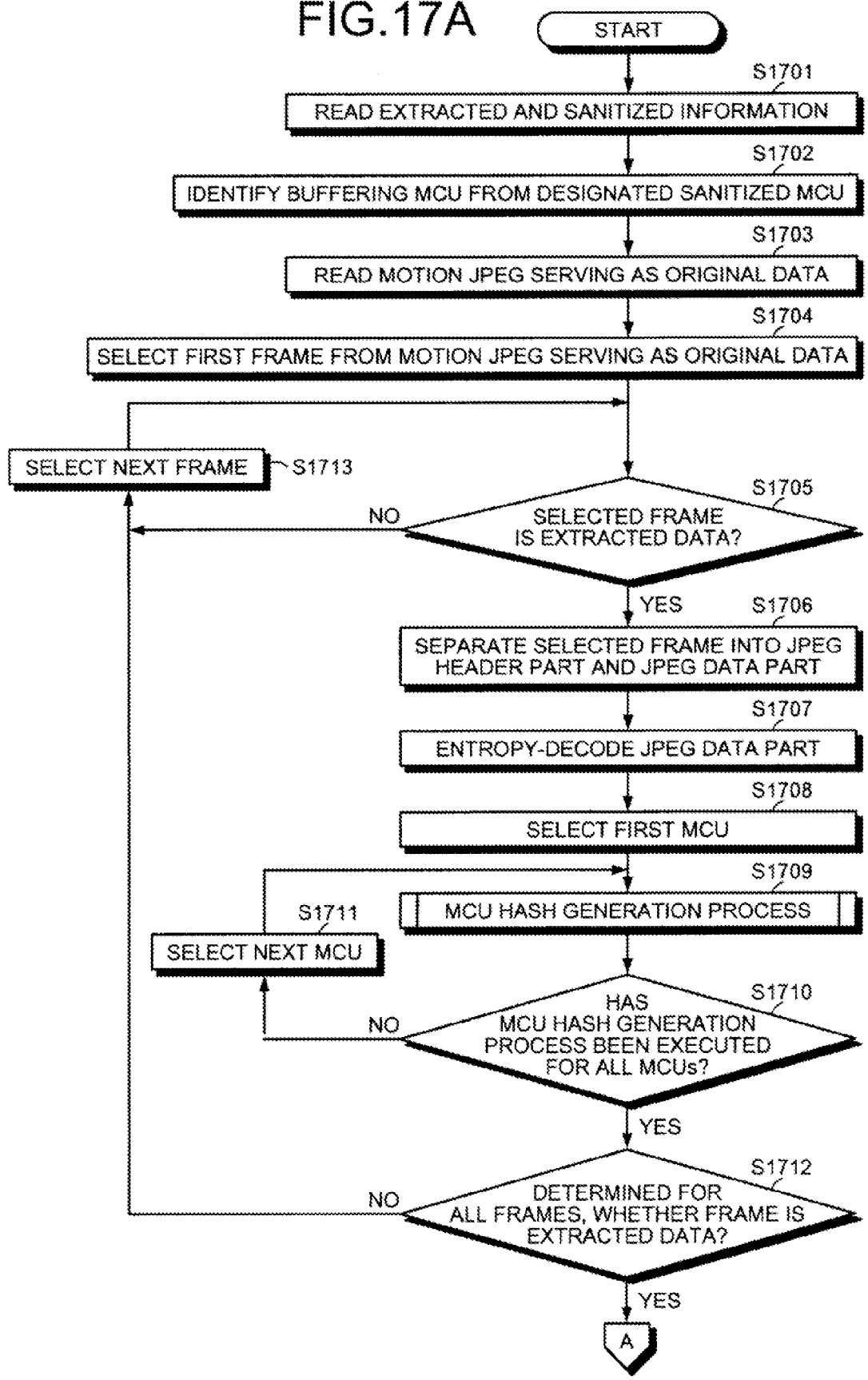

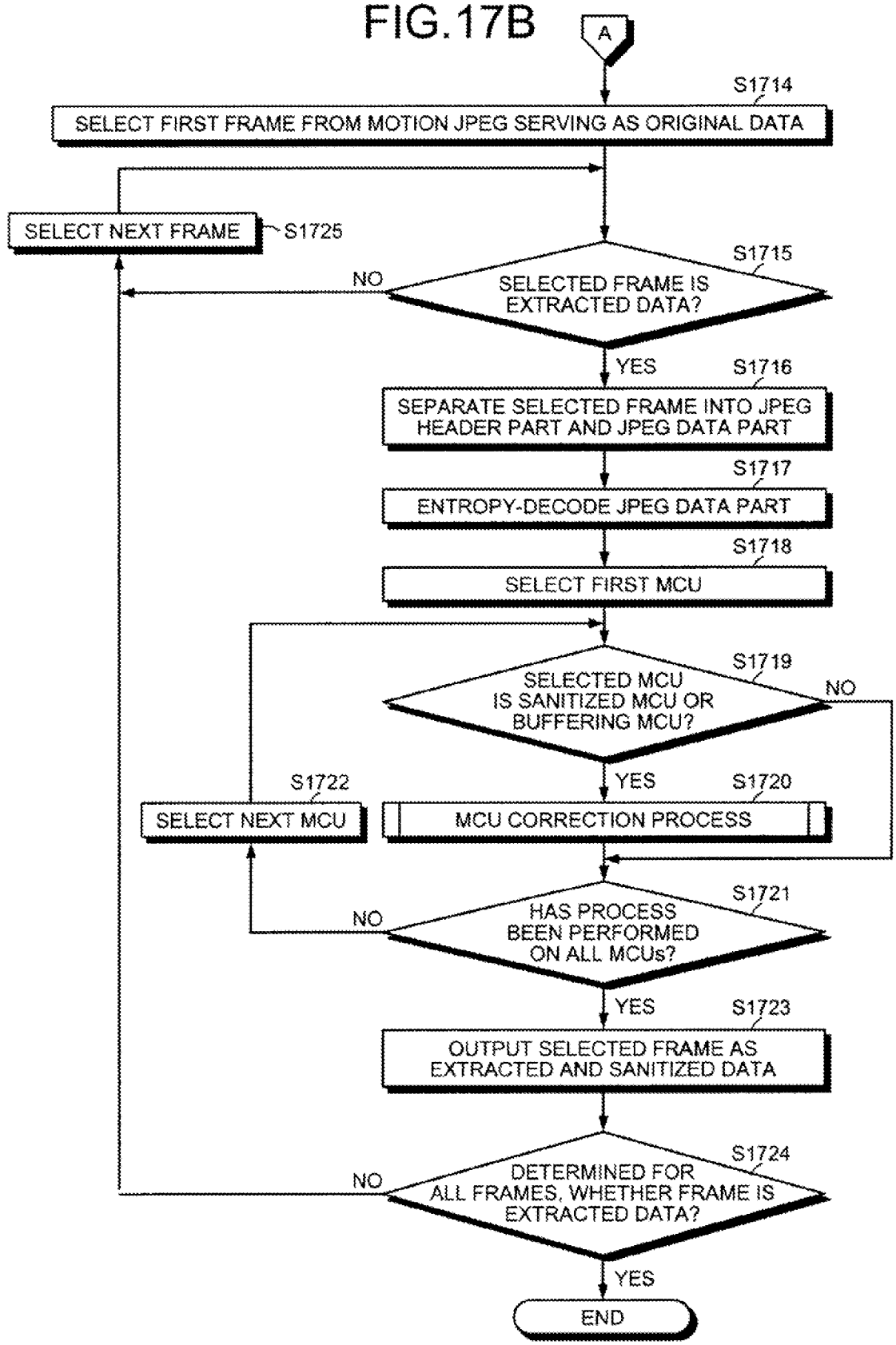

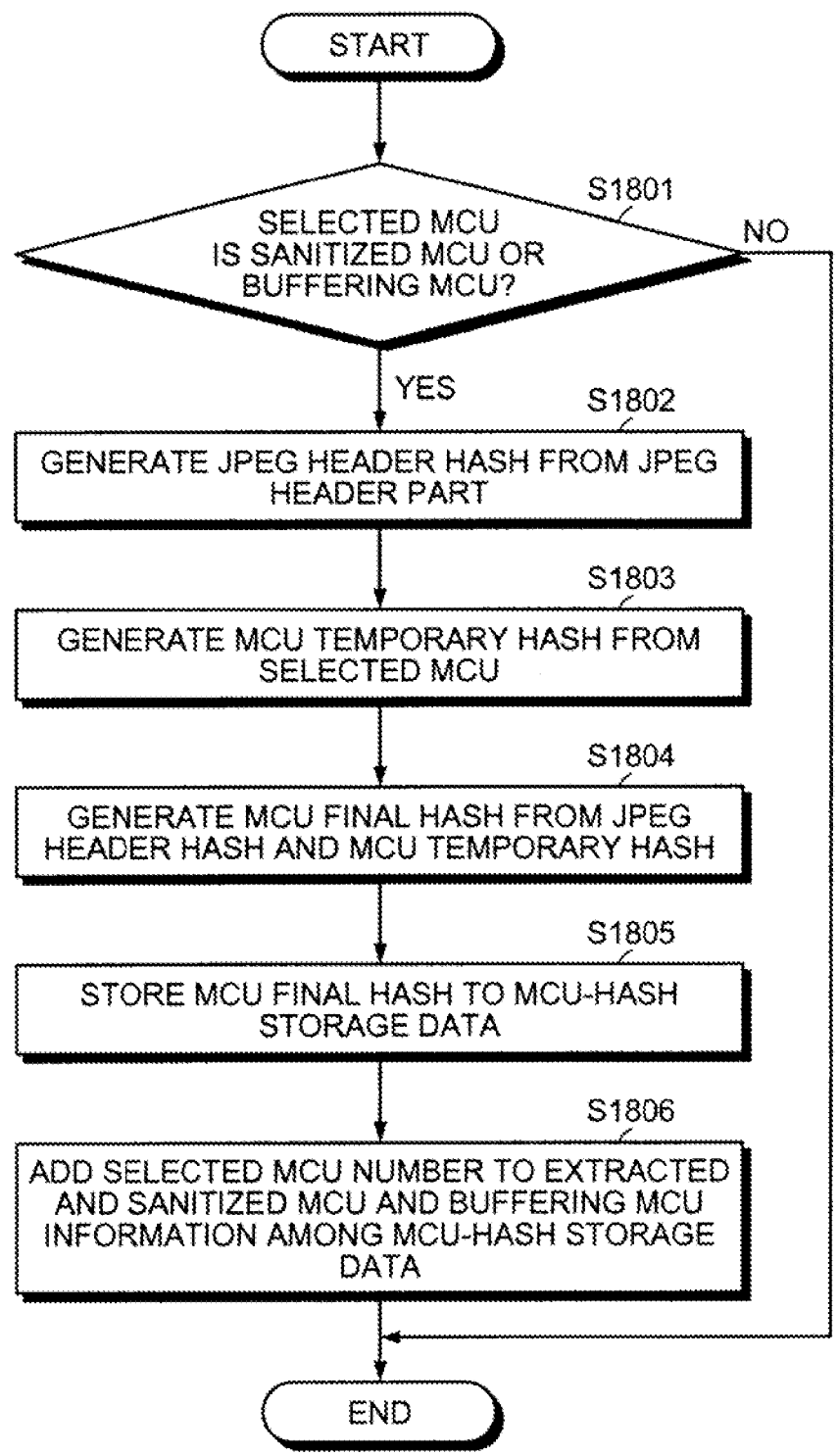

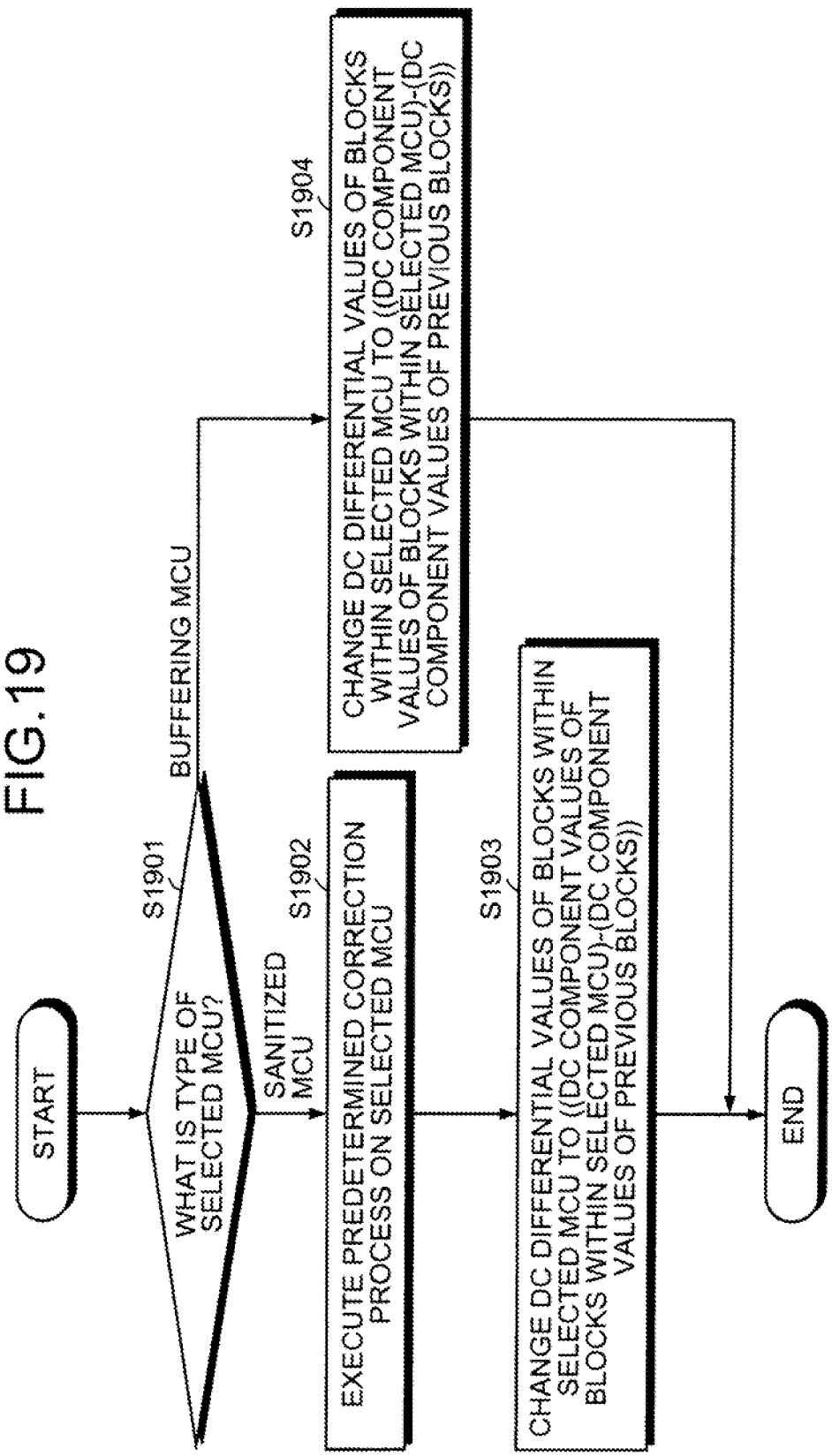

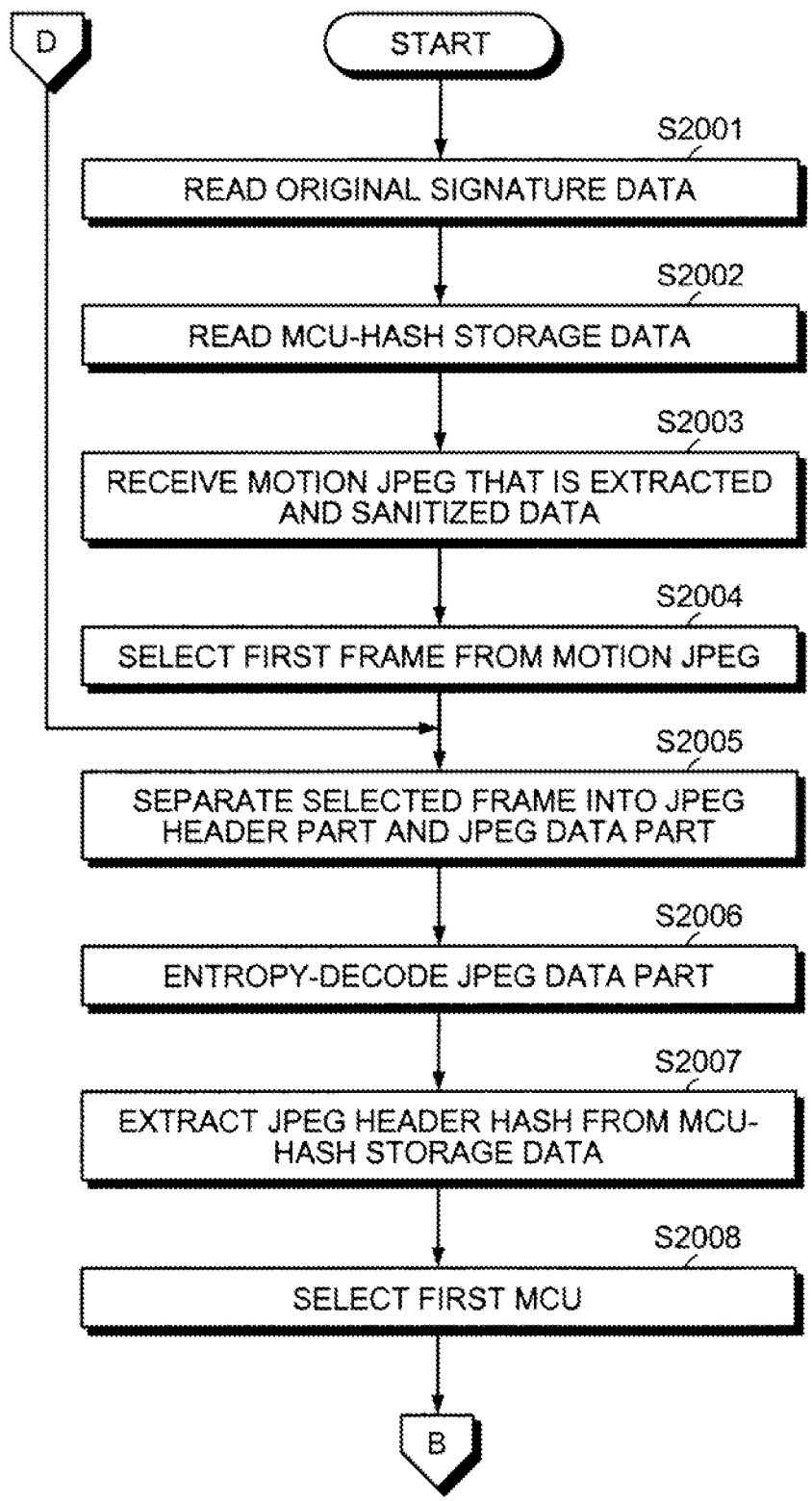

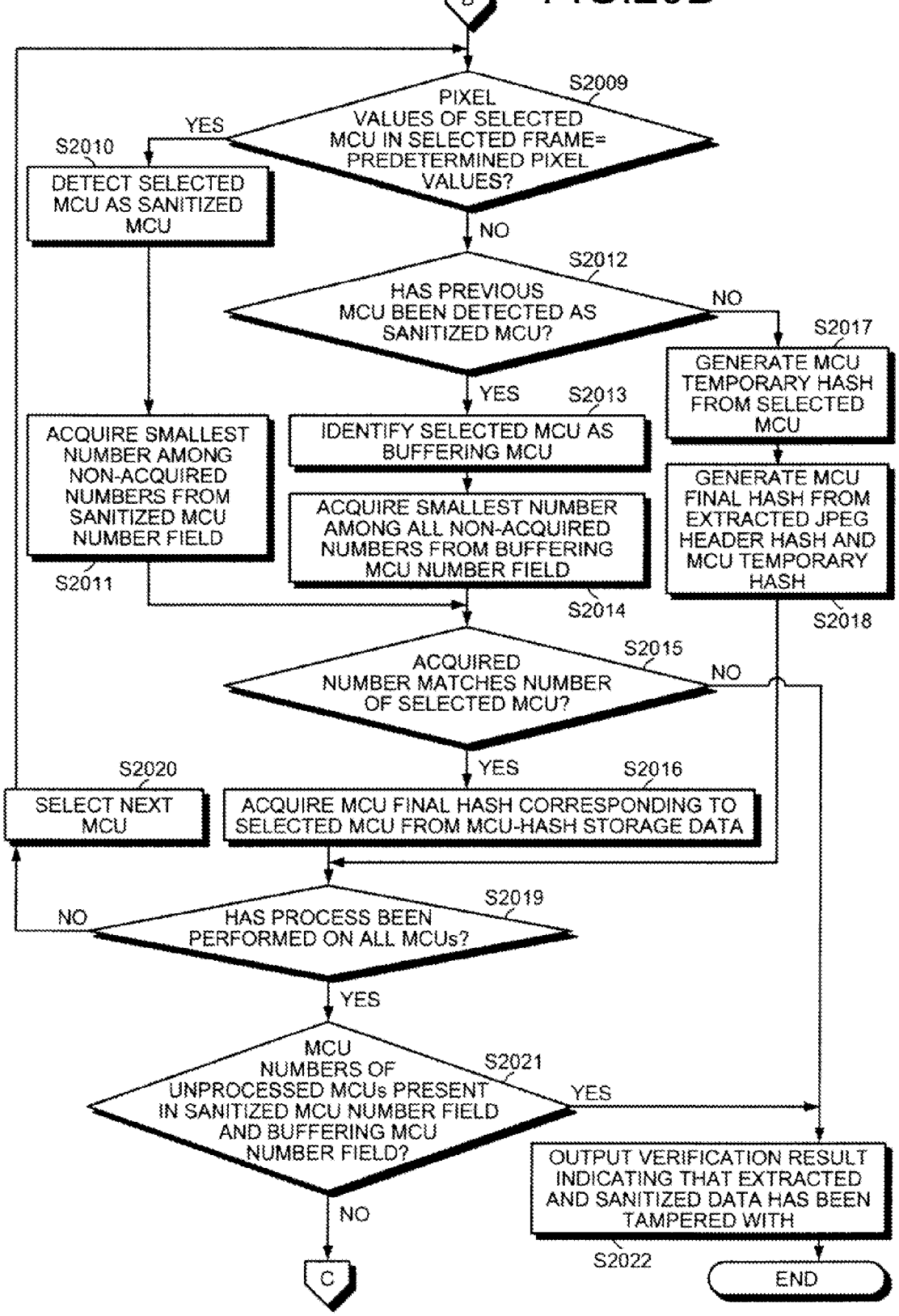

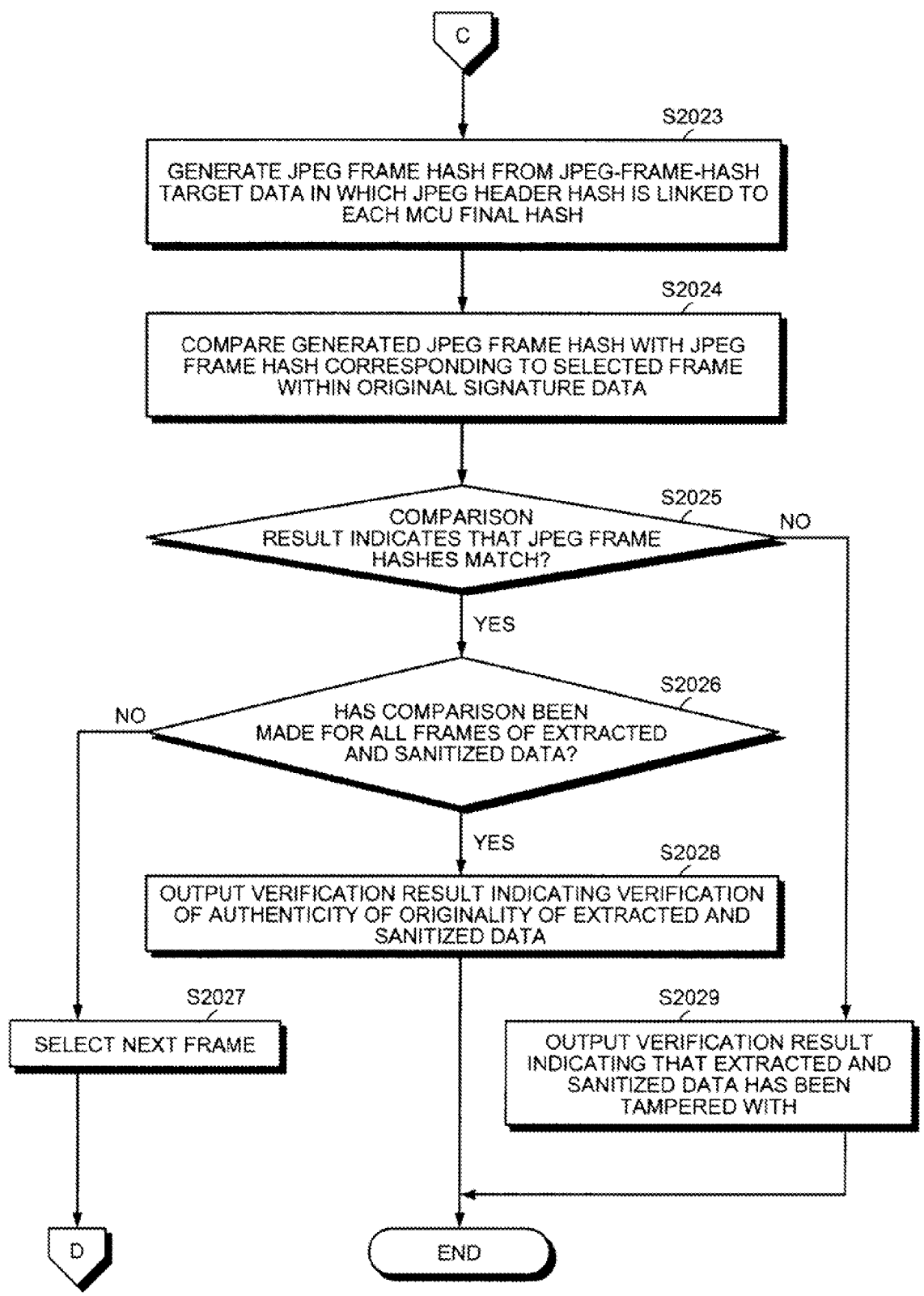

US 8,938,095 B2

VERIFICATION METHOD, VERIFICATION DEVICE, AND COMPUTER PRODUCT

CROSS REFERENCE TO RELATED APPLICATIONS

This application is based upon and claims the benefit of priority of the prior Japanese Patent Application No. 2011-275002, filed on Dec. 15, 2011, the entire contents of which are incorporated herein by reference.

FIELD

The embodiments discussed herein are related to image verification.

BACKGROUND

In recent years, the installation of surveillance cameras in shops, shopping quarters, housing complexes, and the like as well as the installation of drive recorders in business vehicles, and the like have become wide spread, and the number of incidents where video information is used as evidence has increased. Furthermore, the recording of conversations between customers and operators and the retaining of the recorded conversations as evidence to resolve trouble occurring with agreements made over telephone and support services provided by telephone has become common practice.

At present, if a shop is to use video information as evidence, the shop submits a videotape or images without being processed. Advancements in the digital storage of images facilitate tampering and/or editing of images. If the video information is treated as evidence, the shop is requested to add third-party certification such as a signature or a timestamp.

Moreover, consequent to the large data volume, compression techniques may be used when images or motion pictures are submitted. For example, Joint Photographic Experts Group (JPEG) is an image compression format, and Motion JPEG where each video frame is in the JPEG format is a motion-picture compression format. In the JPEG format, each image is divided into multiple areas, and pixel values of each area are retained as differential values from those of an area just before the former area to make the statistical bias of each pixel value large, thereby improving the compression efficiency.

For example, as a technique for detecting third-party tampering, a technique is known for generating digest information for each video frame, and an electronic signature is added to the digest information. The digest information corresponds to a hash that is referred to as a "message digest" and that is calculated using a cryptographically secure one-way hash function. A technique is also known for dividing each original motion picture into a group of pictures (GOPs) that are reproducible minimum units, and for generating hashes for the obtained GOPs, thereby enabling a third party to certify that extracted motion pictures are part of the original motion pictures and have not be tampered with.

Moreover, there has been demand to make data public while sanitizing contents that are desired to be kept private from the perspective of protecting privacy. In relation to this, a technique is known for dividing each image into multiple areas, sanitizing contents of the areas, and generating digest information for each of the areas, thereby enabling the images to be made public in a state where the contents of some areas has been sanitized (see, for example, Published Japanese-Translation of PCT Application, and Publication No. 2010/97923 Japanese Laid-Open Patent Publication Nos. 2009-152713 and 2006-180472).

However, the above conventional techniques have the following problems. When a verification device verifies the originality of the images obtained from the original data according to the image compression format and made public with contents of part of the areas sanitized, it disadvantageously takes a long time for a verification process because the verification device verifies each sanitized area as a signature target of the electronic signature.

SUMMARY

According to an aspect of an embodiment, a verification method that is executed by a computer includes receiving a first image that is a verification subject; acquiring for third and fourth areas that are at positions identical to positions of first and second areas and are among areas obtained by dividing the first image, digest information of the first and second areas before correction, the digest information being acquired from a first storage unit that stores the digest information of the first area before correction, position information of the first area that is a correction target among areas obtained by dividing a second image that is an original, and the digest information of the second area before correction, the second area being identified based on the position information of the first area; generating digest information for other areas different from the third and fourth areas and among the areas obtained by dividing the first image; generating digest information for the first image from a digest target linked to the acquired digest information and to the generated digest information according to position information of areas that are among the areas obtained by dividing the first area and that correspond to the acquired digest information and the generated digest information; and reading digest information from a second storage area storing digest information generated from a digest target linked, according to position information of the areas obtained by dividing the second image, to digest information of the areas obtained by dividing the second image, and verifying authenticity of the first image by comparing the read digest information and the digest information generated for the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A and 10B are explanatory diagrams depicting an example of generating an electronic signature for the Motion JPEG;

FIG. 11 is an explanatory diagram depicting an example of the format of a signature header;

FIGS. 14A and 14B are explanatory diagrams depicting an example of calculating pixel values of the sanitized MCUs and the buffering MCUs;

FIG. 15 is an explanatory diagram depicting an example of verifying extracted and sanitized data;

FIG. 16 is a flowchart depicting an example of a signature generation process;

FIGS. 17A and 17B are flowcharts depicting an example of the extraction and sanitization process;

FIG. 18 is a flowchart depicting an example of a MCU hash generation process;

FIG. 19 is a flowchart depicting an example of a MCU correction process; and FIGS. 20A, 20B, and 20C are flowcharts depicting an example of an extracted and sanitized data verification process.

DESCRIPTION OF EMBODIMENTS

Preferred embodiments of the present invention will be explained with reference to the accompanying drawings.

Figure 1:
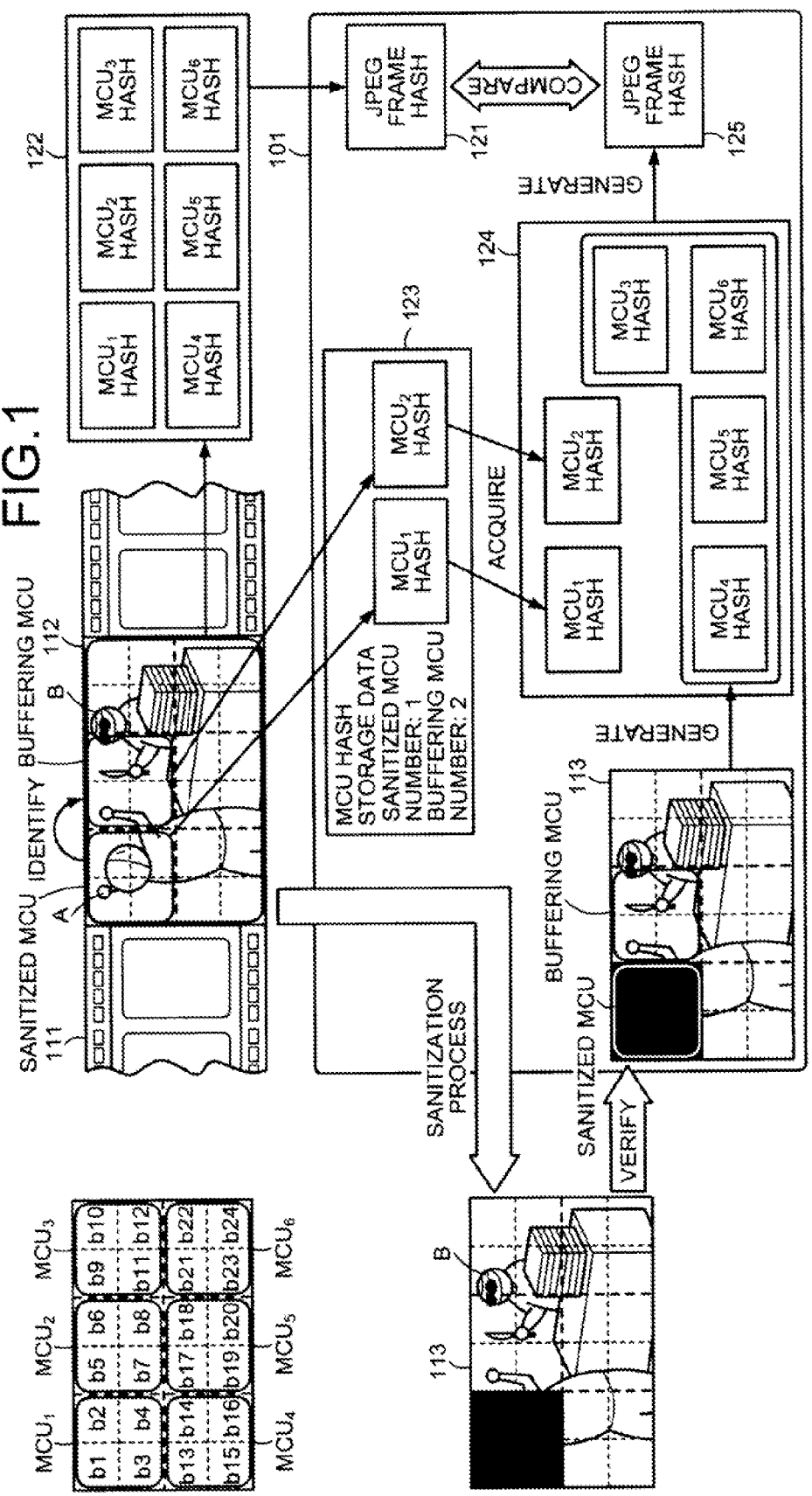
FIG. 1 is an explanatory diagram depicting an example of an operation performed by a verification device according to an embodiment.

FIG. 1 is an explanatory diagram depicting an example of an operation performed by a verification device according to an embodiment of the present invention. FIG. 1 depicts an operation performed by a verification device 101 according to the present embodiment. The verification device 101 that verifies a sanitized image starts a verification process by receiving extracted and sanitized data 113 in which contents of a frame 112 have been sanitized from original data 111 in the Motion JPEG format. The Motion JPEG format is a motion picture compression format and the motion picture format in which intraframe compression is not performed. Furthermore, each frame in the Motion JPEG format is based on a JPEG format that is a still-image compression format. The JPEG format is described later in detail with reference to FIG. 8. For example, the frame 112 and the extracted and sanitized data 113 are in the JPEG format.

In the JPEG format, an image is divided into areas referred to as "minimum coded units" (MCU) and a process is performed in units of MCUs. Furthermore, each MCU is decomposed into pixel value components, and areas of 8×8 (pixels) are referred to as "blocks". In FIG. 1, symbol b denotes a block. In FIG. 1, for example, an image includes $MCU_1$ to $MCU_6$. The MCU includes blocks 1 to 4, the $MCU_2$ includes blocks 5 to 8, and the $MCU_3$ includes blocks 9 to 12. Furthermore, the $MCU_4$ includes blocks 13 to 16, the $MCU_5$ includes blocks 17 to 20, and the $MCU_6$ includes blocks 21 to 24.

Moreover, pixel values of an area indicated by each block are expressed as differential values from those of the block having a block number smaller by one. For example, the pixel values of the block 5 in the $MCU_2$ are expressed as the differential values from those of the block 4. By expressing the pixel values by the differential values, a statistical bias of each of the pixel values in each block is increased and the compression efficiency can be improved.

In such a state, the verification device 101 verifies the extracted and sanitized data 113. While a person A and a person B are in the frame 112, the MCU that displays the person A is sanitized and only the person B is in the extracted and sanitized data 113 to protect the privacy of the person A. In this case, the verification device 101 stores a JPEG frame hash 121 that is a hash of the frame 112. The JPEG frame hash 121 is generated from JPEG-frame-hash target data 122 in which an $MCU_1$ hash to an $MCU_6$ hash are linked according to position information for the $MCU_1$ to the $MCU_6$. The verification device 101 also stores MCU-hash storage data 123 that indicates that the $MCU_1$ that displayed the person A has been sanitized, that a differential value of the $MCU_2$ has been changed as a result of sanitization of the $MCU_1$, and the MCU hash and the $MCU_2$ hash. The sanitized MCU is defined as the sanitized MCU, and the MCU, the differential value of which is changed by the sanitization, is defined as a buffering MCU.

When receiving the extracted and sanitized data 113, the verification device 101 acquires the $MCU_1$ hash and the $MCU_2$ hash from the MCU hash storage data 123 for the $MCU_1$ and the $MCU_2$, respectively, among the MCUs divided from the extracted and sanitized data 113. Next, the verification device 101 generates the $MCU_3$ hash to the $MCU_6$ hash for the $MCU_3$ to the $MCU_6$ other than the $MCU_1$ and the $MCU_2$, respectively.

Next, the verification device 101 sets JPEG-frame-hash target data 124 that links the acquired $MCU_1$ and $MCU_2$ hashes to the generated $MCU_3$ to $MCU_6$ hashes. Next, the verification device 101 generates a JPEG frame hash 125 from the JPEG-frame-hash target data 124. Finally, the verification device 101 verifies whether the extracted and sanitized data 113 is valid by comparing the JPEG frame hash 121 with the JPEG frame hash 125. For example, without tampering of the hashes of the extracted and sanitized data 113, the hashes of the extracted and sanitized data 113 are identical to those of the frame 112. Accordingly, the verification device 101 outputs a verification result that the extracted and sanitized data 113 has not be tampered with.

In this way, the verification device 101 generates the hashes of the extracted and sanitized data 113 by using before-correction hashes of the MCUs that are at the same positions as those in the original data for the sanitized MCU and the buffering MCU identified by the sanitized MCU in the extracted and sanitized data 113. The verification device 101 can thereby promptly verify the originality because the verification device 101 makes a hash comparison only once irrespectively of the number of sanitized areas.

Figure 2:
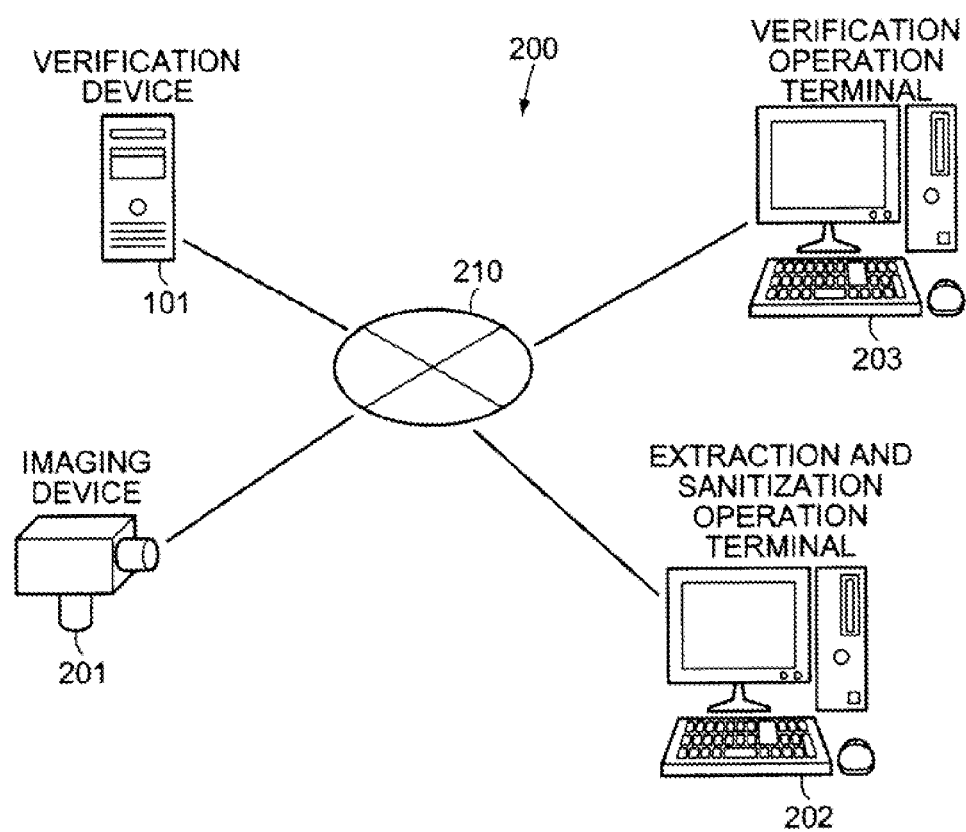
FIG. 2 is an explanatory diagram depicting an example of connection in a verification system.

FIG. 2 is an explanatory diagram depicting an example of connection in a verification system. A verification system 200 that verifies images includes the verification device 101, an imaging device 201, an extraction and sanitization operation terminal 202, and a verification operation terminal 203. The verification device 101 and the imaging device 201 to the verification operation terminal 203 are connected to one another by a network 210.

The verification device 101 verifies the originality of the extracted and sanitized data 113. Furthermore, the verification device 101 according to the present embodiment generates an electronic signature for the original data 111, and extracts the extracted and sanitized data 113 from the original data 111. Note that a device that generates the electronic signature and a device that extracts data can be devices different from the verification device 101. The imaging device 201 generates the original data 111. For example, the imaging device 201 is installed in a hospital or the like as a surveillance camera.

The extraction and sanitization operation terminal 202 designates an extraction position and a sanitized position from the original data 111. For example, the extraction and sanitization operation terminal 202 designates the extraction position and the sanitization position from the original data 111 by an operation of an extraction and sanitization operator when the police or the like asks that the original data 111 is made public.

The verification operation terminal 203 transmits a verification request to verify the originality of the extraction and sanitization data 113 to the verification device 101, and receives the verification result. For example, when receiving from the police, a court, or the like, the verification request to verify the originality, the verification operation terminal 203 transmits the verification request to verify the originality of the extraction and sanitization data 113 to the verification device 101 by an operation of a verifier.

Figure 3:
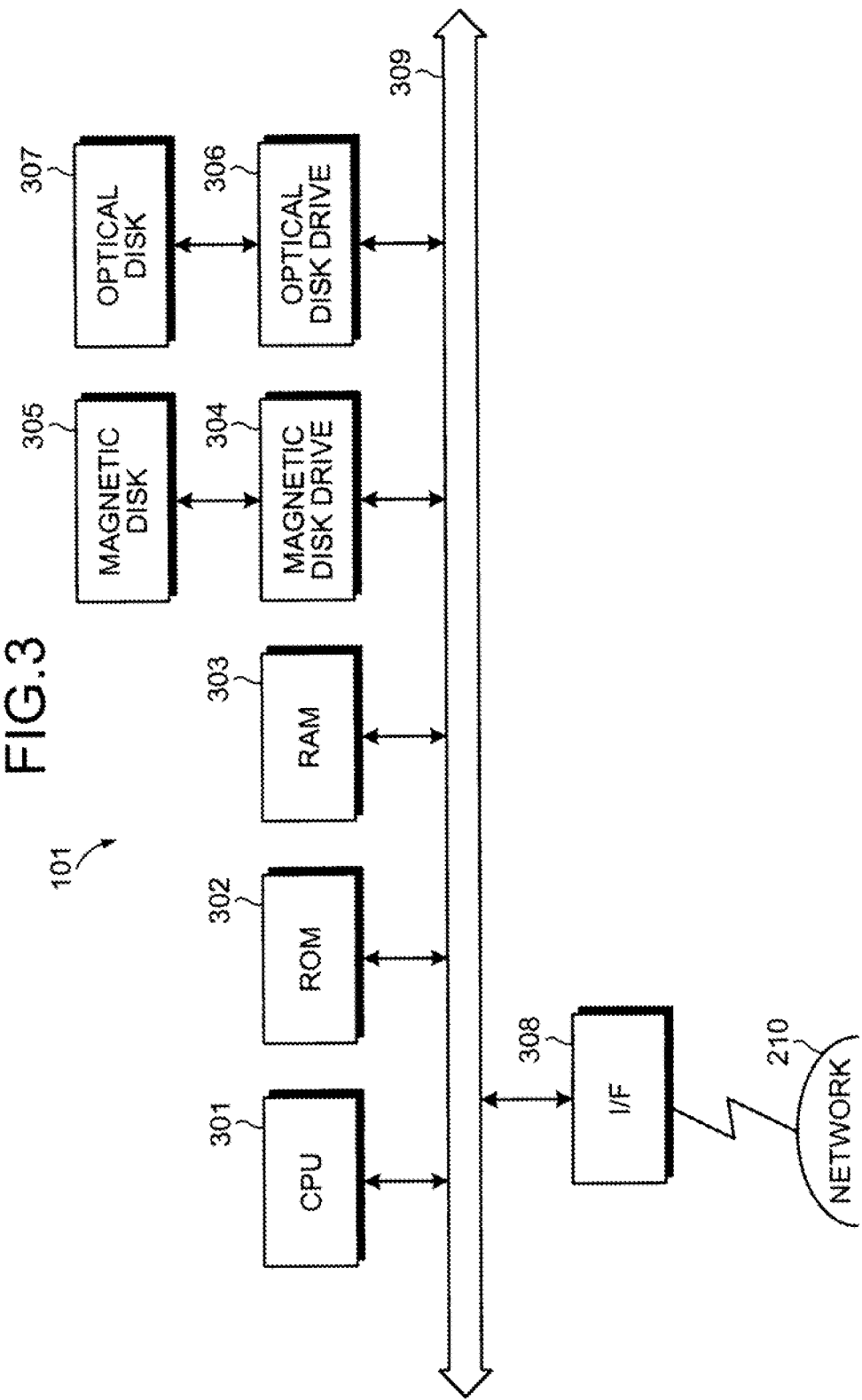
FIG. 3 is a block diagram of a hardware configuration of the verification device.

FIG. 3 is a block diagram of a hardware configuration of the verification device. As depicted in FIG. 3, the verification device includes a central processing unit (CPU) 301, a read-only memory (ROM) 302, a random access memory (RAM) 303, a magnetic disk drive 304, a magnetic disk 305, an optical disk drive 306, an optical disk 307, and as an input apparatus of the user and/or other devices, an interface (I/F) 308, respectively connected by a bus 300.

The CPU 301 governs overall control of the verification device. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer. The verification program of the present embodiment may be stored in any one of the storage devices including ROM 302, the magnetic disk 305, and the optical disk 307.

The I/F 308 is connected to a network 210 such as a local area network (LAN), a wide area network (WAN), and the Internet through a communication line and is connected to other apparatuses through the network 210. The I/F 309 administers an internal interface with the network 210 and controls the input/output of data from/to external apparatuses. For example, a modem or a LAN adaptor may be employed as the I/F 309.

The verification device 101 may include a display, a keyboard, and a mouse as an interface with the user. Further, the imaging device 201 may include a CPU, ROM, RAM, keyboard, camera device, etc. The extraction and sanitization operation terminal 202 and the verification operation terminal 203 may include a CPU, ROM, RAM, magnetic disk drive, magnetic disk, optical disk drive, optical disk, display, I/F, keyboard, and a mouse.

Figure 4:
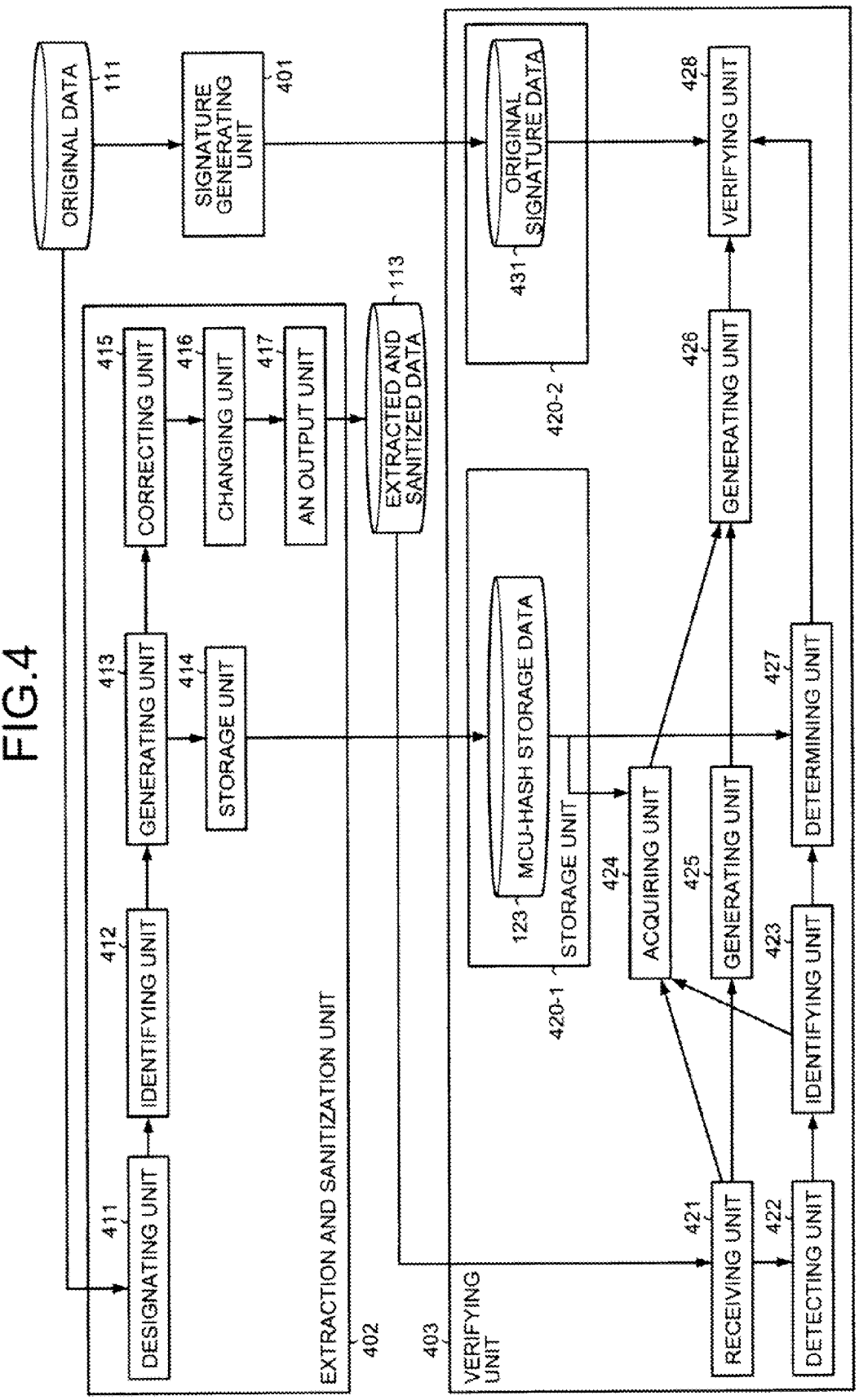
FIG. 4 is a block diagram depicting an example of functions of the verification device.

Functions of the verification device 101 are described next. FIG. 4 is a block diagram depicting an example of the functions of the verification device. The verification device 101 includes a signature generating unit 401, an extraction and sanitization unit 402, and a verifying unit 403. The functions (the signature generating unit 401 to the verifying unit 403) serving as a controller are realized by causing the CPU 301 to execute the program stored in a storage device. For example, the storage device is the ROM 302, the RAM 303, the magnetic disk 305, or the optical disk 307. Alternatively, the functions can be realized by causing another CPU to execute the program via the I/F 308.

The extraction and sanitization unit 402 includes a designating unit 411, an identifying unit 412, a generating unit 413, a storage unit 414, a correcting unit 415, a changing unit 416, and an output unit 417. The verifying unit 403 includes a storage unit 420-1, a storage unit 420-2, a receiving unit 421, a detecting unit 422, an identifying unit 423, an acquiring unit 424, a generating unit 425, a generating unit 426, a determining unit 427, and a verifying unit 428. While the verification device 101 includes three functions, that is, the signature generating unit 410 to the verifying unit 403, a device that includes the signature generating unit 401, a device that includes the extraction and sanitization unit 402, and a device that includes the verifying unit 403 can be provided separately. Note that the correcting unit 415 can be included as the function of the extraction and sanitization operation terminal 202.

The verification device 101 can access the original data 111, the extracted and sanitized data 113, the MCU-hash storage data 123, and original signature data 431. Note that the original data 111, the extracted and sanitized data 113, the MCU-hash storage data 123, and the original signature data 431 are stored in a storage device such as the ROM 302, the RAM 303, the magnetic disk 305, the optical disk 307, and the like. Data in the Motion JPEG format received from the imaging device 201 or data in the JPEG format can be used as the original data 111.

The extracted and sanitized data 113 is data obtained by extracting partial data from the original data 111 and sanitizing a part of areas. Data in the Motion JPEG format or the JPEG format can be used as the extracted and sanitized data 113. The MCU-hash storage data 123 is data that stores hashes of a header part of the JPEG used for signature verification and hashes of the MCUs among the original data 111. The original signature data 431 is data concerning the hash of each of the frames of the original data 111 and an electronic signature assigned to each hash.

The signature generating unit 401 has a function to generate signatures for the original data 111. For example, the signature generating unit 401 generates digest information for each of the areas obtained by dividing each of images, each of which serves as one frame of the original data 111. The areas correspond herein to the areas indicated by the MCUs depicted in FIG. 1, respectively. The digest information is described hereinafter simply as "hash". Next, the signature generating unit 401 generates hashes for information other than the respective regions of each image for the images. The other information refers to a "JPEG header part". The JPEG header part is described later with reference to FIG. 8. The signature generating unit 401 generates hashes of each image in proportion to combination of hashes of the other information and those of the respective areas, and stores the original signature data 431 that is the hashes of the respective images in the storage area.

The extraction and sanitization unit 402 includes functions to extract data from the original data 111 and to sanitize of a part of the data. For example, the extraction and sanitization unit 402 extracts designated frames from the Motion JPEG file (hereinafter, also simply "Motion JPEG") that is the original data 111, and outputs the extracted and sanitized data 113 in which the designated areas in the frames have been sanitized.

The verifying unit 403 has a function to verify whether the originality of the extracted and sanitized data 113 is authentic. For example, the verifying unit 403 divides each of the Motion JPEG images that are the extracted and sanitized data 113 into the areas, generates the hash of each image from the hashes of the respective areas, compares the generated hashes of the images with those in the original signature data 431, thereby verifying the authenticity of the originality.

The designating unit 411 has a function to designate a first area that is a correction target among the areas obtained by dividing each image. For example, the first area is the $MCU_1$ in an example of FIG. 1. Note that the number that uniquely identifies the designated area is stored in the storage area such as the RAM 303, the magnetic disk 305, or the optical disk 307.

The identifying unit 412 has a function to identify a second area in which pixel values are expressed by the differential values from those in the first area. The pixel values are color information indicated by pixels. For example, three component values of a luminance component value, a blue color-difference component value, and a red color-difference component value or those of a red component value, a green component value, and a blue component value can be used as the pixel values. Furthermore, if the images are grayscale images, the pixel values are the luminance component values. For example, the identifying unit 412 identifies the $MCU_2$ in which pixel values are expressed by differential values from those of the $MCU_1$.

Alternatively, the identifying unit 412 can identify the second area located at a next position to the first area in an image scanning direction. The scanning direction of scanning the MCUs is a horizontal direction, and a next row is scanned when scanning reaches a right end of one row. In the example of FIG. 1, the MCUs are scanned in an order of the $MCU_1$, the $MCU_2$, the $MCU_3$, the $MCU_4$, the $MCU_5$, and the $MCU_6$. Numbers that uniquely identify the identified areas are stored in the storage area such as the RAM 303, the magnetic disk 305, or the optical disk 307.

The generating unit 413 has a function to generate the hash of the before-correction first area and that of the second area. For example, the generating unit 413 generates the hash of the before-correction $MCU_1$ and the hash of the before-correction $MCU_2$. A cryptographically secure one-way hash function has algorithms such as Message Digest 5 (MD5), Secure Hash Algorithm (SHA)-1, and SHA-256. The generating unit 413 stores the generated hashes in the storage area such as the RAM 303, the magnetic disk 305, or the optical disk 307.

The storage unit 414 has a function to store position information of the first area, the hash of the first area, position information of the second area, and the hash of the second area in the storage area when the generating unit 413 generates the hash of the first area and that of the second area. Furthermore, the hash of the first area serves as the hash for the pixel values before the correcting unit 415 makes a correction. As the position information, the number that uniquely identifies an area or lateral and longitudinal positions in the image can be used.

For example, the storage unit 414 stores "1" that is the number serving as the position information of the $MCU_1$, the hash of the $MCU_1$, "2" that is the number serving as the position information of the $MCU_2$, and the hash of the $MCU_2$ in the MCU-hash storage data 123.

The correcting unit 415 has a function to correct the first area by a predetermined correction process. The predetermined correction process is not limited to a specific process as long as the correction process is a process for correcting pixel values in the first area. For example, the correcting unit 415 can perform a sanitization process, pixelization, or a blurring process. For example, the correcting unit 415 corrects the $MCU_1$ by the sanitization process. The correcting unit 415 performs the correction process after the storage unit 414 stores the position information of the first area, the hash of the first area, the position information of the second area, and the hash of the second area in the storage area.

For example, after transmitting an extraction and sanitization request to the verification device 101, the extraction and sanitization operation terminal 202 locks correction of the first area so as not to correct the first area. Next, after the storage unit 414 finishes a process, the verification device 101 transmits a correction permission notification to the extraction and sanitization operation terminal 202, the extraction and sanitization operation terminal 202 unlocks the correction of the first area, corrects the first area, and transmits pixel values in the corrected area to the verification device 101. Furthermore, when the verification device 101 receives the extraction and sanitization request and is able to perform the processes up to that performed by the storage unit 414 after receipt, the extraction and sanitization operation terminal 202 does not need to lock the correction of the first area. The pixel values in the corrected area are stored in the storage area such as the RAM 303, the magnetic disk 305, or the optical disk 307.

The changing unit 416 has a function to change the differential values of the second area from the differential values between the pixel values in the second area and the pixel values in the before-correction first area to the pixel values between the pixel values in the second area and the pixel values in the after-correction first area when the correcting unit 415 corrects the first area. For example, it is assumed that the pixel values in the $MCU_2$ are 75 and that the pixel values in the after-correction $MCU_1$ are 0. On this assumption, the changing unit 416 changes the differential values in the second area to {(the pixel values 75 in the $MCU_2$)–(the pixel values 0 in the after-correction $MCU_1$)}=75.

The output unit 417 has a function to output an image that includes the after-correction first area and the after-change second area. For example, the output unit 417 outputs the extraction and sanitized data 113. As an output destination, the output unit 417 can write the extracted and sanitized data 113 to a storage area such as the RAM 303, the magnetic disk 305, and the optical disk 307, or can output the extracted and sanitized data 113 to the extraction and sanitization operation terminal 202 that transmits the extraction and sanitization request.

The storage unit 420-1 stores the position information of the first area that is the correction target among multiple areas obtained by dividing a second image that is an original, the hash of the before-correction first area, and the hash of the second area identified based on the before-correction first area. For example, with reference to the example of FIG. 1, the first area is the $MCU_1$ that is the sanitized MCU in the frame 112, and the second area is the $MCU_2$ that is the buffering MCU in the frame 112. In this case, the storage unit 420-1 stores "1" in the MCU-hash storage data 123 as a sanitized MCU number, and also the hash of the $MCU_1$ and the hash of the $MCU_2$ that is the buffering MCU.

The storage unit 420-2 stores the hash of the second image. For example, the storage unit 420-2 stores the hash generated from the JPEG-frame-hash target data 122 in which the hashes of the areas are linked according to position information of the areas obtained by dividing the second image. For example, the storage unit 420-2 stores the JPEG frame hash 121 of the frame 112. For example, the JPEG frame hash 121 is present in the original signature data 431.

The receiving unit 421 has a function to receive the first image that is a verification subject. For example, the first image serves as the extracted and sanitized data 113. The received data is stored in the storage area such as the RAM 303, the magnetic disk 305, or the optical disk 307.

The detecting unit 422 has a function to detect a third area in which pixel values are equal to specific pixel values among the areas obtained by dividing the first image. For example, the specific pixel values are all 0 when the sanitization process is performed. Alternatively, when black-and-white pixelization is performed, the specific pixel values are either 255 or 0. For example, the detecting unit 422 detects the $MCU_1$ within which the pixel values are all 0 among the MCUs of the extracted and sanitized data 113. Note that the number that uniquely identifies the detected area is stored in the storage area such as the RAM 303, the magnetic disk 305, or the optical disk 307.

The identifying unit 423 has a function to identify a fourth area in which pixel values are expressed by differential values from the pixel values in the third area. For example, the identifying unit 423 identifies the $MCU_2$ in which the pixel values are expressed by differential values from the pixel values in the $MCU_2$ of the extracted and sanitized data 113. Note that the number that uniquely identifies the detected area is stored in the storage area such as the RAM 303, the magnetic disk 305, or the optical disk 307.

The acquiring unit 424 has a function to acquire the hashes of the before-correction first and second areas for the third and fourth areas located at the same positions as those of the first and second areas, respectively among the areas obtained by dividing the first image. For example, it is assumed that "1" is stored in the MCU-hash storage data 123 as the MCU number of the sanitized MCU serving as the first area in the frame 112. On this assumption, the third area located at the same position as that of the first area serves as the $MCU_1$ of the extracted and sanitized data 113, and the acquiring unit 424 acquires the hash of the before-correction $MCU_1$ from the MCU-hash storage data 123.

It is also assumed that "2" is stored in the MCU-hash storage data 123 as the MCU number of the buffering MCU serving as the second area in the frame 112. On this assumption, the fourth area located at the same position as that of the second area serves as the $MCU_2$ of the extracted and sanitized data 113, and the acquiring unit 424 acquires the hash of the before-correction $MCU_2$ from the MCU-hash storage data 123.

Furthermore, the acquiring unit 424 can acquire the digest information of the before-correction first and second areas located at the same positions as those of the third and fourth areas, respectively for the third area detected by the detecting unit 422 and the fourth area identified by the identifying unit 423 among the areas obtained by dividing the first image.

For example, when the detecting unit 422 detects the $MCU_1$ of the extracted and sanitized data 113 as the third area, the acquiring unit 424 acquires the hash of the before-correction $MCU_1$ in the frame 112 located at the same position as that of the third area from the MCU-hash storage data 123. Furthermore, when the identifying unit 423 identifies the $MCU_2$ of the extracted and sanitized data 113 as the fourth area, the acquiring unit 424 acquires the hash of the before-correction $MCU_2$ in the frame 112 located at the fourth area from the MCU-hash storage data 123. The acquired hashes, pointers to address where the hashes are stored, and the like are stored in the storage area such as the RAM 303, the magnetic disk 305, or the optical disk 307.

The generating unit 425 has a function to generate hashes of other areas that are different from either the third or fourth area among the areas obtained by dividing the first image. For example, if n is an integer equal to or greater than 1 and MCU numbers "1" and "2" are depicted as the position information of the first and second areas for the $MCU_n$ among the MCUs of the extracted and sanitized data 113, the MCUs that are the $MCU_3$ and the following are the different areas. At this time, the generating unit 425 generates hashes of the $MCU_n$. The generated hashes are stored in the storage area such as the RAM 303, the magnetic disk 305, or the optical disk 307.

The generating unit 426 generates the hash for the first image from the digest target obtained by linking the hashes acquired by the acquiring unit 424 to those generated by the generating unit 425. At this time, the generating unit 426 generates the hash of the first image according to the position information of the areas corresponding to the digest information acquired by the acquiring unit 424 and that generated by the generating unit 425 among the areas obtained by dividing the first image. For example, the generating unit 426 sets the JPEG-frame-hash target data 124 in which the hash of the acquired $MCU_1, \ldots,$ and the hashes of the generated $MCU_n$ are linked to one another, and generates the hashes of the extracted and sanitized data 113 from the JPEG-frame-hash target data 124. The generated hashes are stored in the storage area such as the RAM 303, the magnetic disk 305, or the optical disk 307.

The determining unit 427 has a function to determine whether the first area at the same position as that of the third area is present and whether the second area at the same position as that of the fourth area is present when the fourth area is identified. For example, the determining unit 427 compares whether the MCU number of the $MCU_1$ of the extracted and sanitized data 113 detected by the detecting unit 422 is the same as the MCU number of the sanitized MCU stored in the MCU-hash storage data 123. The determining unit 427 also compares whether the MCU number of the $MCU_2$ of the extracted and sanitized data 113 identified by the identifying unit 423 is the same as the MCU number of the buffering MCU number stored in MCU-hash storage data 123. Comparison results are stored in the storage area such as the RAM 303, the magnetic disk 305, or the optical disk 307.

The verifying unit 428 has a function to verify the authenticity of the originality of the first image by comparing the hash of the second image read from the storage unit 420-2 with the hash of the first image generated by the generating unit 426. For example, the verifying unit 428 compares the hash of the original signature data 431 with the hashes of the extracted and sanitized data 113, thereby verifying the authenticity of the originality of the extracted and sanitized data 113. For example, when a comparison result indicates that the hashes match each other, the verifying unit 428 outputs a verification result indicating that the extracted and sanitized data 113 has not been tampered with and that the authenticity of the originality of the extracted and sanitized data 113 is accepted.

Alternatively, the verifying unit 428 can verify the authenticity of the first image by using a determination result of the determining unit 427 and the result of the comparison between the hash of the first image and that of the second image. For example, when the determination result indicates that the first and second areas are not at positions identical to positions of the third and fourth areas, respectively, the verifying unit 428 outputs a verification result indicating that the extracted and sanitized data 113 has been tampered with. When the determination result indicates that the first and second areas are at the same positions as those of the third and fourth areas, respectively, and the comparison result indicates that the hashes match each other, the verifying unit 428 outputs the verification result indicating that the extracted and sanitized data 113 has not been tampered with and that the authenticity of the originality is accepted. The verification result can be stored in the storage area such as the RAM 303, the magnetic disk 305, or the optical disk 307, or can be transmitted to the verification operation terminal 203 that transmits the verification request to verify the authenticity of the originality of the extracted and sanitized data 113.

Figure 5:
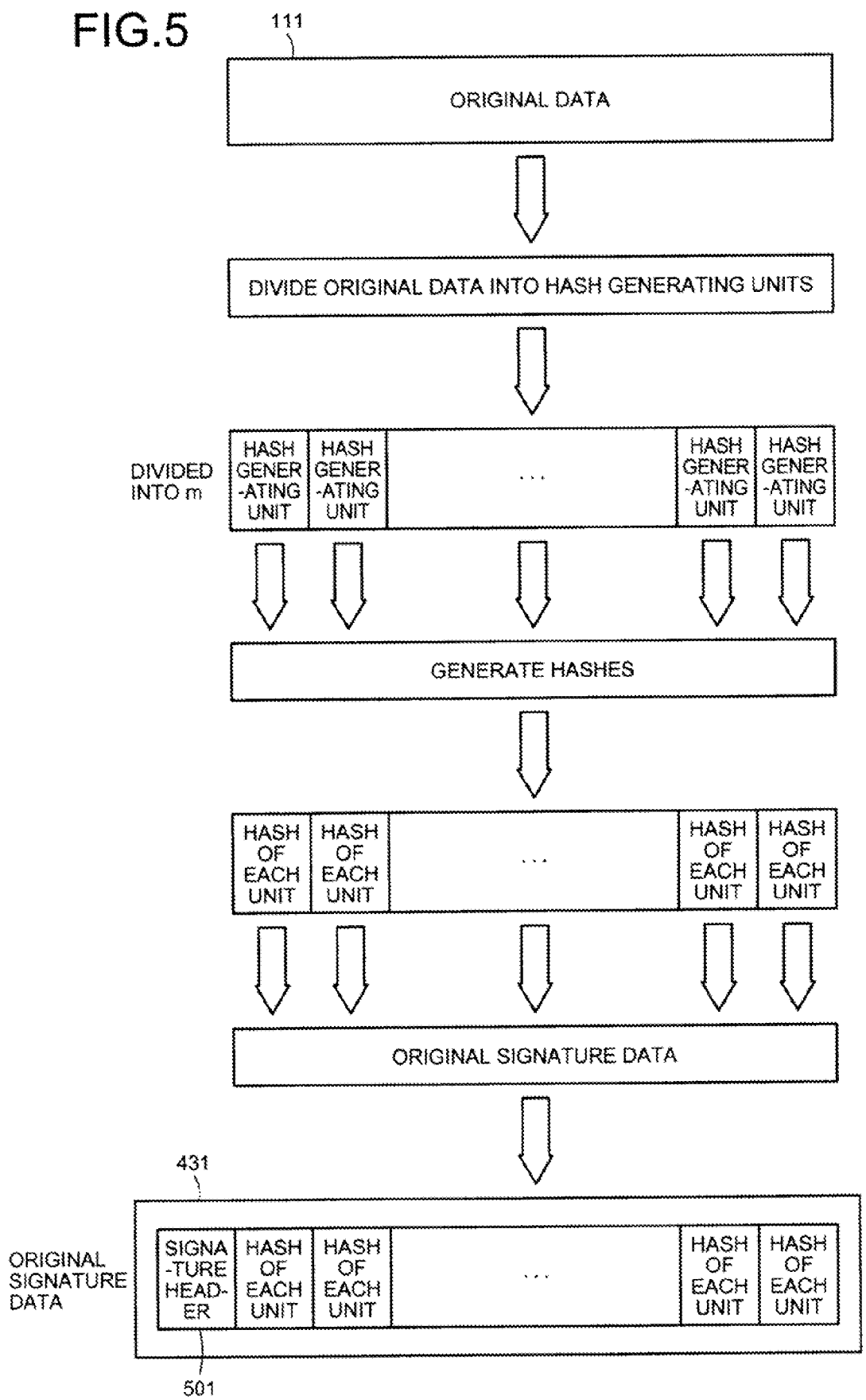
FIG. 5 is an explanatory diagram depicting an example of generating an electronic signature for original data.

FIG. 5 is an explanatory diagram depicting an example of generating the electronic signature for the original data. First, the verification device 101 divides the original data 111 into hash generating units. In FIG. 5, the original data 111 is divided into m hash generating units, where m is an integer equal to or greater than 1. Note that the verification device 101 can divide the original data 111 into equal hash generating units or into hash generating units different in size.

Next, the verification device 101 generates hashes of the hash generating units, respectively. The verification device 101 then generates an electronic signature with data obtained by linking the hashes of the units set as a signature target. The verification device 101 can link a signature header 501 to the signature target. The generated data is the original signature data 431 for the entire original data 111.

Figure 6:
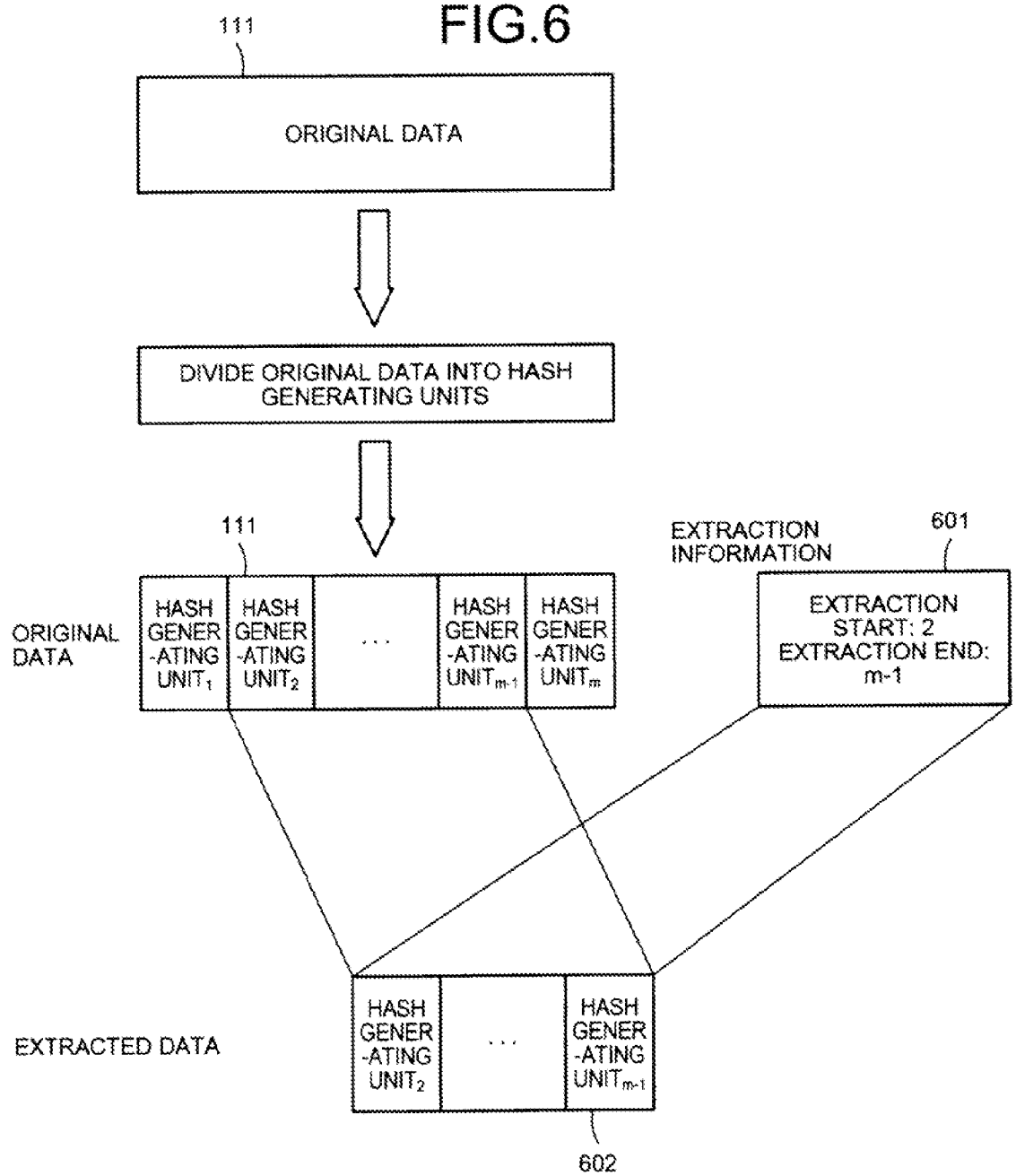
FIG. 6 is an explanatory diagram depicting an example of generating extracted data.

FIG. 6 is an explanatory diagram depicting an example of generating extracted data. First, the verification device 101 divides the original data 111 into the hash generating units. Next, the verification device 101 extracts extracted data 602 from the original data 111 based on extraction information 601. The extraction information 601 contains two fields of an extraction start field and an extraction end field. In the example of FIG. 6, the extraction information 601 indicates that extraction start: 2 and that extraction end: m-1, so that the verification device 101 extracts a hash generating unit2 to a hash generating unitm-2.

Figure 7:
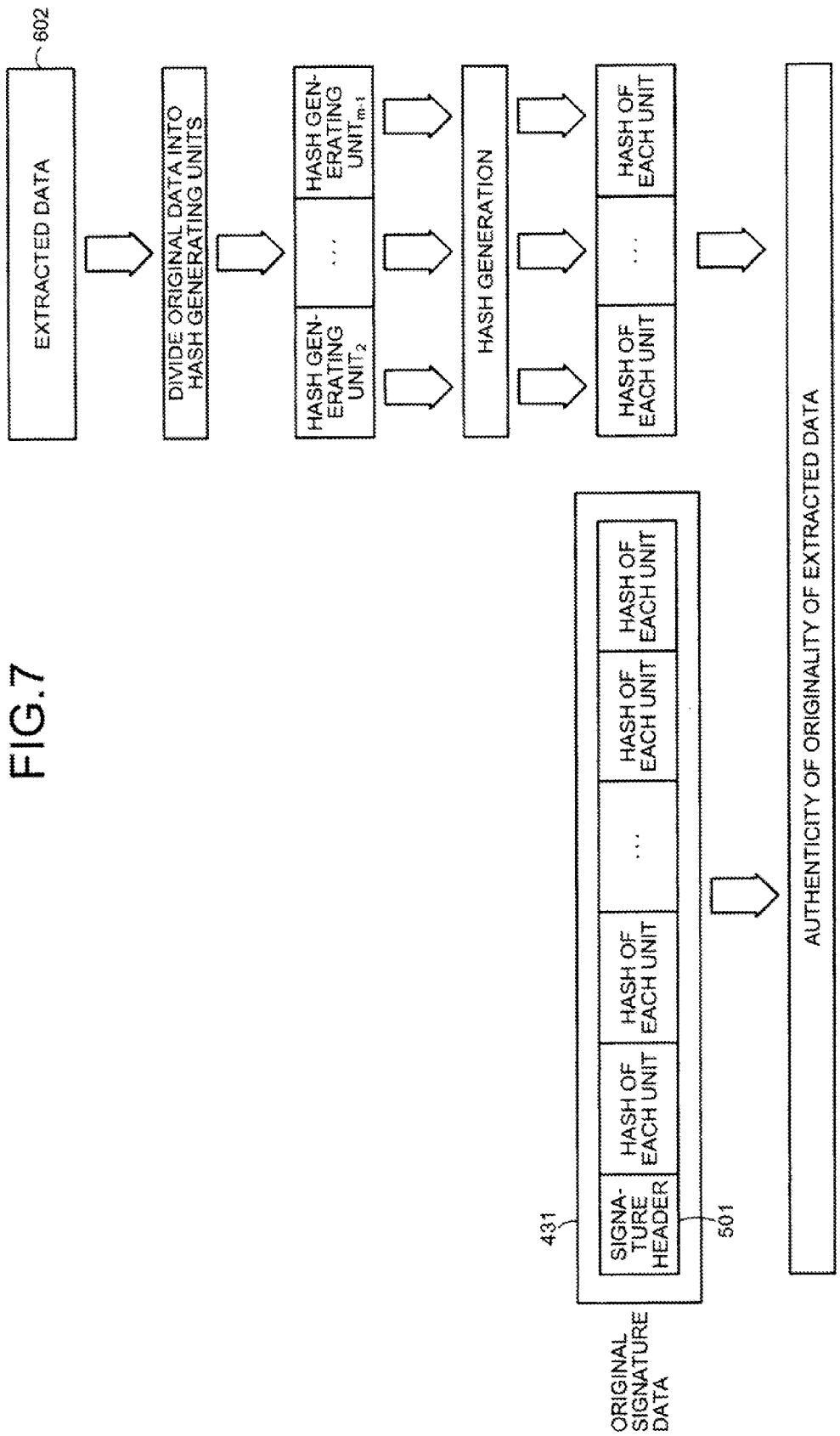
FIG. 7 is an explanatory diagram depicting an example of verifying the authenticity of the originality of extracted data.

FIG. 7 is an explanatory diagram depicting an example of verifying the authenticity of the originality of the extracted data. First, the verification device 101 divides the extracted data 602 into the hash generating units and generates hashes of the hash generating units, respectively. For example, the verification device 101 generates hashes of the hash generating unit2 to the hash generating unitm-1, respectively. Next, the verification device 101 compares the generated hashes with the hashes of the respective units of the original signature data 431, thereby verifying whether the originality of the extracted data 602 is authentic.

Figure 8:
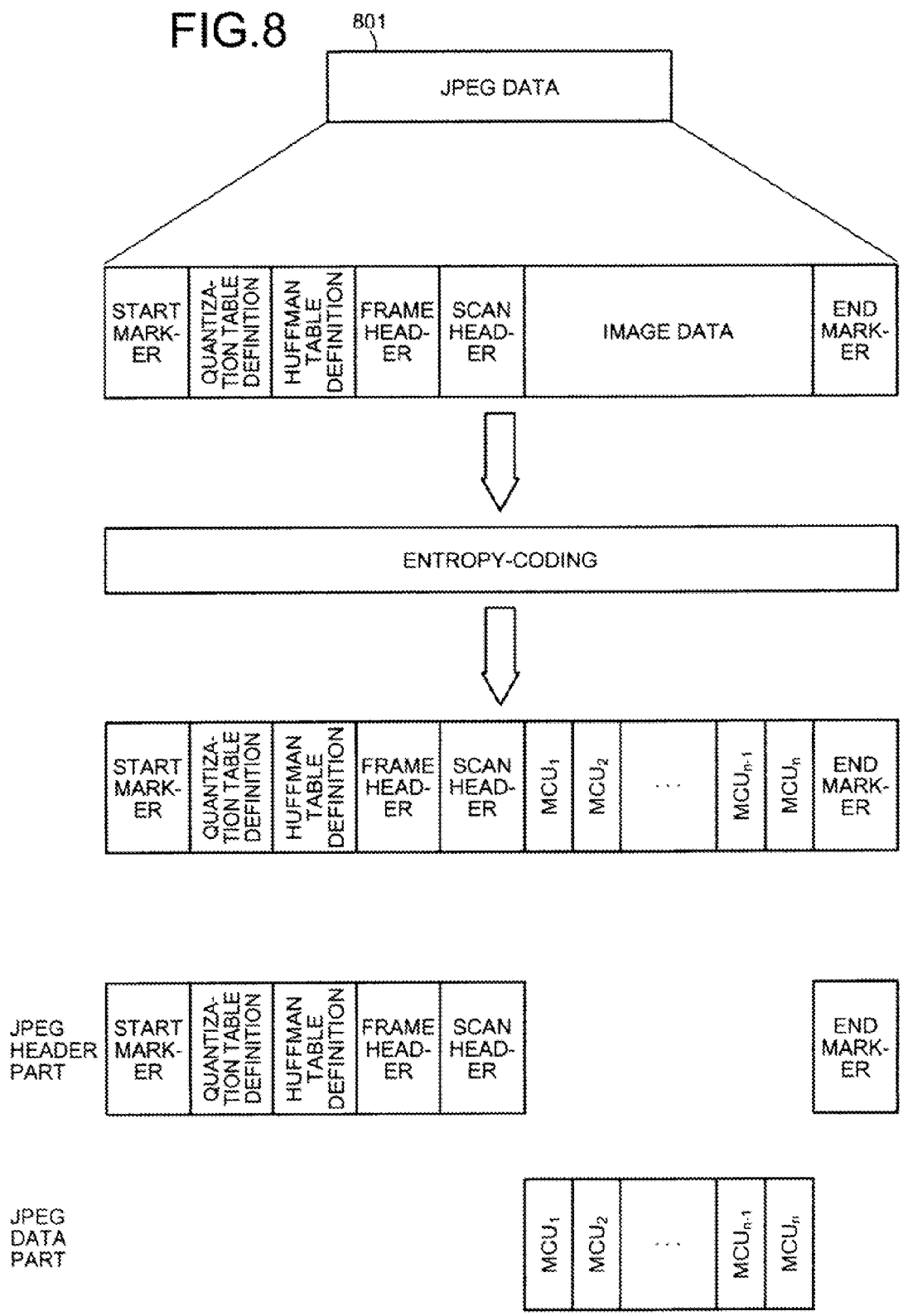
FIG. 8 is an explanatory diagram depicting an example of separating JPEG data.

FIG. 8 is an explanatory diagram depicting an example of separating JPEG data. JPEG data 801 can be separated into segments at markers defined in the JPEG format. Specific examples of the markers include a start marker, a quantization table definition, a Huffman table definition, a frame header, a scan header, and an end marker.

The start marker indicates a start of the JPEG data 801. The quantization table definition indicates that a quantization table is defined in the segment. The Huffman table definition indicates that a Huffman table is defined in the segment. The frame header indicates that a type, an image size, and the like of a JPEG file are defined. The scan header is added in front of image data. The end marker indicates an end of the JPEG data 801.

The verification device 101 performs entropy decoding to separate the image data into MCUs. Note that the verification device 101 can decode the JPEG data by subsequently performing dequantization and inverse discrete cosine transform (DCT). However, the verification device 101 performs only the entropy decoding because it suffices to perform a process of entropy decoding so as to separate the image data into the MCUs. In the example of FIG. 8, the verification device 101 separates the image data into the $MCU_1$ to the $MCU_n$, where n is an integer equal to or greater than 1.

The verification device 101 then separates the entropy-decoded JPEG data 801 into a JPEG header and a JPEG data part. The JPEG data part contains the $MCU_1$ to the $MCU_n$, whereas the JPEG header part contains the segments other than the JPEG data part. For example, the JPEG header part contains the start marker to the scan header and the end marker.

Figure 9:
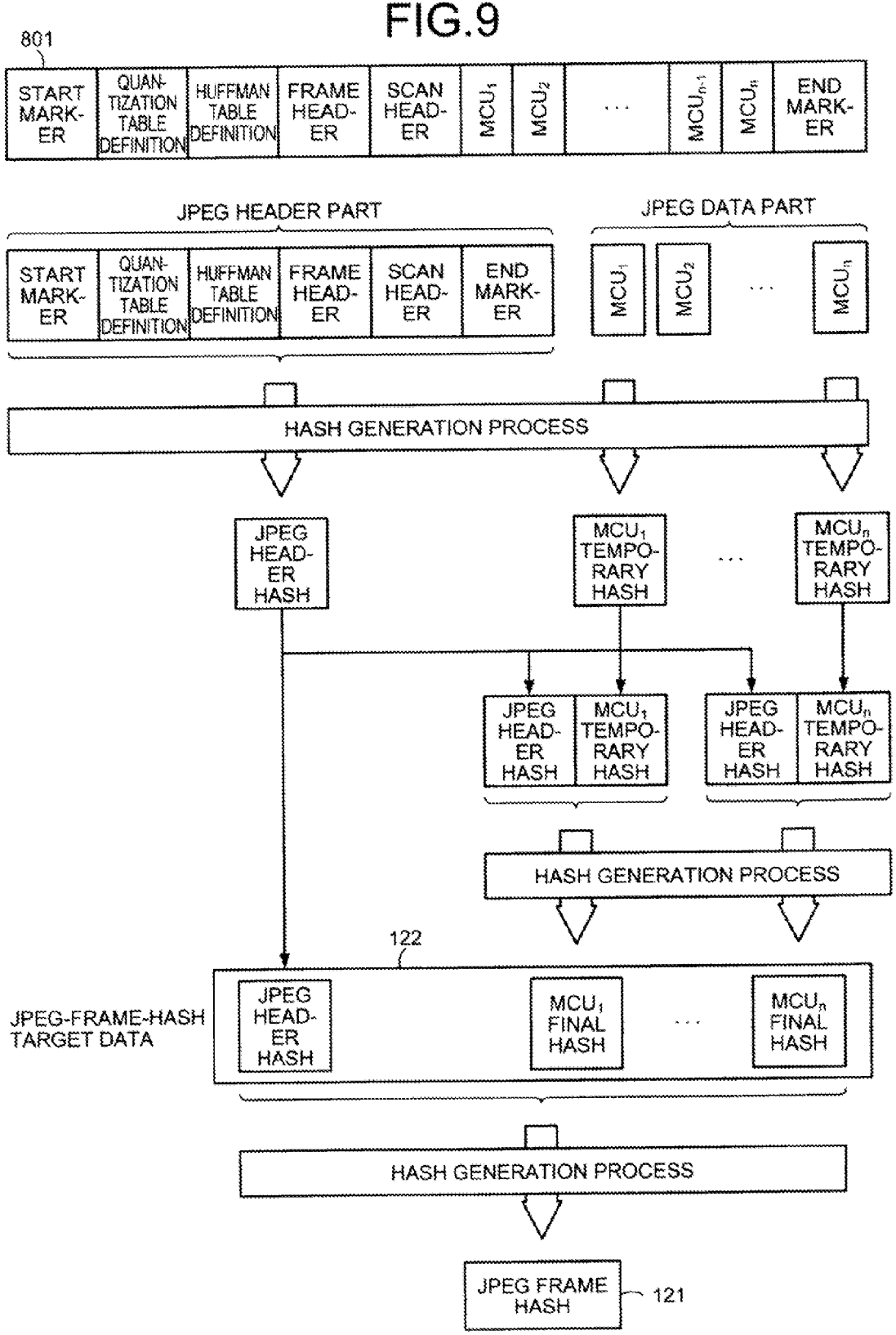
FIG. 9 is an explanatory diagram depicting an example of generating hashes of the JPEG data.

FIG. 9 is an explanatory diagram depicting an example of generating hashes of the JPEG data. First, the verification device 101 generates hashes for the JPEG header part and the $MCU_1$ to the $MCU_n$, respectively. For example, the verification device 101 generates a JPEG header hash as the hash generated from the JPEG header part. The verification device 101 also generates an $MCU_1$ temporary hash as the hash generated from the $MCU_1$, and an $MCU_n$ temporary hash as the hash calculated from the $MCU_n$.

Next, the verification device 101 generates an MCU final hash from the JPEG header hash and each of the MCU temporary hashes. For example, the verification device 101 generates an MCU final hash from the JPEG header hash and the MCU temporary hash. In this way, the verification device 101 generates the MCU final hash for each of the MCU temporary hashes, and finally generates an $MCU_n$ final hash from the JPEG header hash and the $MCU_n$ temporary hash.

Next, the verification device 101 sets data obtained by linking the JPEG header hash to the MCU final hashes to the JPEG-frame-hash target data 122, and generates the JPEG frame hash 121 from the JPEG-frame-hash target data 122. As for the JPEG-frame-hash target data 122, an order of linking the hashes is according to the MCU numbers. For example, the verification device 101 links the $MCU_1$ final hash to the $MCU_n$ final hash in an order of the $MCU_1$ final hash, ..., and the $MCU_n$ final hash. As for the JPEG header hash, the JPEG header hash can be linked in front of the $MCU_1$ final hash or linked next to the $MCU_n$ final hash. A linking order can be set arbitrarily as long as the JPEG-frame-hash target data 122 and the JPEG-frame-hash target data 124 are identical in the linking order.

FIGS. 10A and 10B are explanatory diagrams depicting an example of generating an electronic signature for the Motion JPEG. In FIGS. 10A and 10B, an example of generating the electronic signature is described while applying an example of generating the electronic signature for the entire original data 111 described with reference to FIG. 5 and an example of generating the hashes described with reference to FIG. 9 to the Motion JPEG. In FIGS. 10A and 10B, it is assumed that the original data 111 is audio video interleave (AVI) Motion JPEG, and that the original data 111 includes media data such as video and voice.

The verification device 101 generates a hash per frame for the Motion JPEG serving as the original data 111. The example of FIG. 10A depicts a state of generating the hash for a frame 2 from the Motion JPEG in which a frame 1 to a frame m are present.

As a process (1) depicted in FIG. 10A, the verification device 101 separates the frame 2 into the JPEG header part and the JPEG data part, and generates hashes of the JPEG header part and the MCUs within the JPEG data part, respectively. In the example of FIG. 10A, the hashes are generated using SHA-256 as a hash computation method. The verification device 101 generates the JPEG header hash and the $MCU_n$ temporary hash to the $MCU_n$ temporary hash.

As a process (2) depicted in FIG. 10B, the verification device 101 generates the MCU final hashes from the JPEG header hash and the respective MCU temporary hashes. In the example of FIG. 10B, the verification device 101 generates the $MCU_1$ final hash from the JPEG header hash and the $MCU_1$ temporary hash using the SHA-256. Similarly, the verification device 101 generates the $MCU_2$ to $MCU_n$ final hashes from the JPEG header hash and the respective $MCU_2$ to $MCU_n$ temporary hashes using the SHA-256.

As a process (3) depicted in FIG. 10B, the verification device 101 sets the data obtained by linking the generated JPEG header hash to the generated $MCU_1$ to $MCU_n$ final hashes to the JPEG-frame-hash target data 122. Next, the verification device 100 generates the JPEG frame hash 121 from the JPEG-frame-hash target data 122. In the example of FIG. 10B, the verification device 101 generates a JPEG frame 2 hash from the JPEG header hash and the $MCU_1$ to $MCU_n$ final hashes using the SHA-256.

The verification device 101 executes a signature generation process on the signature header 501 and the generated JPEG frame 1 hash to JPEG frame m hash as a signature target. For example, the verification device 101 generates an electronic signature file according to PKCS#7 (Public-Key Cryptography Standards No7) form from the signature target. An example of a format of the signature header 501 is described later with reference to FIG. 11.

FIG. 11 is an explanatory diagram depicting an example of the format of the signature header. The signature header 501 contains seven fields, that is, a signature-generation algorithm type field, a certificate data field, a certificate data size field, a certificate password field, an original data field, a total JPEG data size field, and a signed JPEG-data number field. An algorithm for generating the electronic signature is stored in the signature-generation algorithm type field. For example, a character string such as "PIAT" indicating a sanitized signature method or a pointer indicating the character string is stored in the signature-generation algorithm type field.

The substance of certificate data is stored in the certificate data field. Note that an address of the storage area in which the certificate data is stored can be stored in the certificate data field. The certificate data is data for certifying that a public key for digital signature analysis is authentic. The size of the certificate data is stored in the certificate data size field. A password of the certificate is stored in the certificate password field.

The Motion JPEG serving as the original data 111 is stored in the original data field. An address of the storage area in which the original data 111 is stored can be stored in the original data field. The size of the JPEG data contained in the original data 111 is stored in the total JPEG data size field. The number of pieces of JPEG data on which signatures are added is stored in the signed JPEG-data number field. After the signature header 501, the JPEG frame hashes as many as the signed JPEG data are stored.

Figure 12:
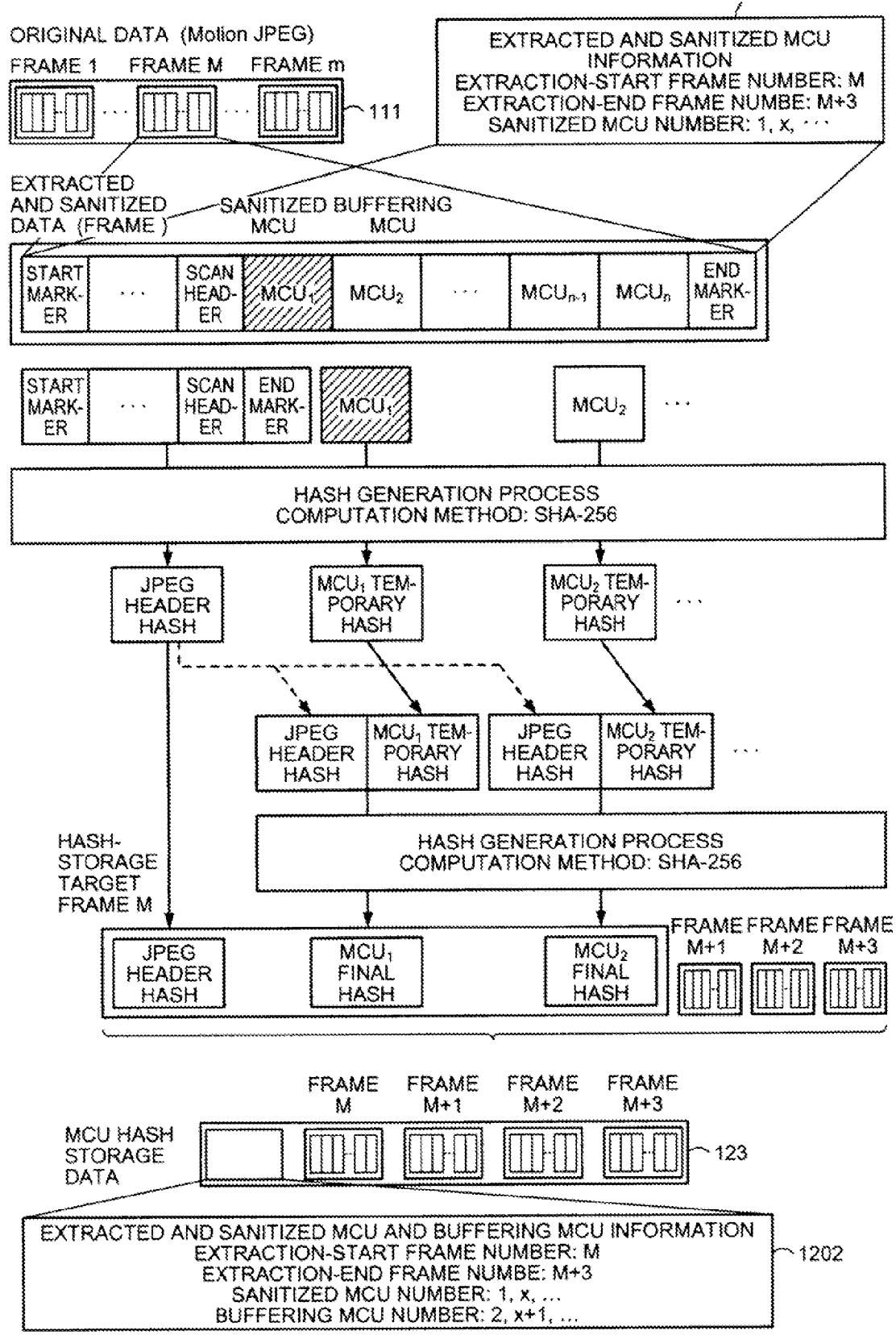
FIG. 12 is an explanatory diagram depicting an example of a hash storage process for a sanitized MCU and a buffering MCU.

FIG. 12 is an explanatory diagram depicting an example of a hash storage process for the sanitized MCU and the buffering MCU. In FIG. 12, an example of generating the extracted data 602 described with reference to FIG. 6 is applied to the Motion JPEG, and the hash storage process is performed for the sanitized MCU and the buffering MCU.

The verification device 101 extracts data from the Motion JPEG using extracted and sanitized MCU information 1201 in which information of the sanitized MCU is added to information of the extraction MCU. Furthermore, the verification device 101 adds extracted and sanitized MCU and buffering MCU information 1202 in which information of the buffering MCU is added to the extracted and sanitized MCU information 1201 is added into the MCU-hash storage data 123. In the present embodiment, the extraction and sanitization operation terminal 202 is assumed to generate the extracted and sanitized MCU information 1201 by an operation of an extraction and sanitization operator, and to transmit the extracted and sanitized MCU information 1201 to the verification device 101.

The extracted and sanitized MCU information 1201 contains three fields, that is, an extraction-start frame number field, an extraction-end frame number field, and a content-detected MCU number field. The frame number of the frame at which extraction from the original data 111 starts is stored in the extraction-start number field. The frame number of the frame at which the extraction from the original data 111 ends is stored in the extraction-end frame number field. The frames designated in the extraction-start frame number field to the extraction-end frame number field serve as the extracted data. The MCU number of the MCU to be sanitized within each of the frames that serve as the extracted data is stored in the sanitized MCU number field.

In the extracted and sanitized MCU information 1201, it is assumed that all the frames that serve as the extracted data are the same in the MCU number of the MCU to be sanitized. If the frames differ in the MCU number of the MCU to be sanitized differs, the extracted and sanitized MCU information 1201 can hold the MCU numbers of the sanitized MCUs for the respective frames.

The extracted and sanitized MCU and buffering MCU information 1202 includes a buffering MCU number field in addition to the three fields of the extracted and sanitized MCU information 1201. The number of the buffering MCU identified based on the sanitized frame is stored in the buffering MCU number field. For example, the number of the next MCU to the sanitized MCU is stored in the buffering MCU number field.

For example, the extraction-start frame number: M, the extraction-end frame number: M+3, the sanitized MCU number: 1, x, . . . are stored in the extracted and sanitized MCU information 1201. M is an integer equal to or greater than 1 and equal to or smaller than m, and x is an integer equal to or greater than 2 and equal to or smaller than n. The verification device 101 extracts the four frames from the frame M to the frame M+3 designated in the extraction-start frame number field and the extraction-end frame number field as the extracted data.

Next, the verification device 101 generates hashes of the sanitized MCU designated in the sanitized MCU number field and the buffering MCU identified from the sanitized MCU, respectively for each of the four frames that serve as the extracted data. For example, the verification device 101 generates the $MCU_1$ temporary hash and the $MCU_2$ temporary hash as the hashes of the $MCU_1$ serving as the sanitized MCU and the $MCU_2$ serving as the buffering MCU, respectively.

Moreover, the verification device 101 generates the $MCU_1$ final hash from the JPEG header hash and the $MCU_1$ temporary hash, and the $MCU_2$ final hash from the JPEG header hash and the $MCU_2$ temporary hash. Because the $MCU_x$ is also designated as the sanitized MCU, the verification device 101 generates the MCU final hashes for the $MCU_x$ serving as the sanitized MCU and the $MCU_{x+1}$ serving as the buffering MCU, respectively. If x=2, the sanitized MCUs are $MCU_1$ and $MCU_2$ and the buffering MCU is the $MCU_3$.

After generating the MCU final hashes of the sanitized MCUs and the buffering MCU, the verification device 101 sets the JPEG header hash and the MCU final hashes to a hash-storage-target frame M and stores the hash-storage-target frame M in the MCU-hash storage data 123. Subsequently, the verification device 101 stores the hash-storage-target frame M+1 to the hash-storage-target frame M+3 in the MCU-hash storage data 123.

Furthermore, the verification device 101 adds the extracted and sanitized MCU and buffering MCU information 1202 to the MCU-hash storage data 123. For example, the extracted and sanitized MCU and buffering MCU information 1202 depicted in FIG. 12 indicates that the verification device 101 adds "2" and "x+1" to the buffering MCU number field as the MCU numbers of the $MCU_2$ and the $MCU_{x+1}$ identified as the buffering MCUs.

Figure 13:
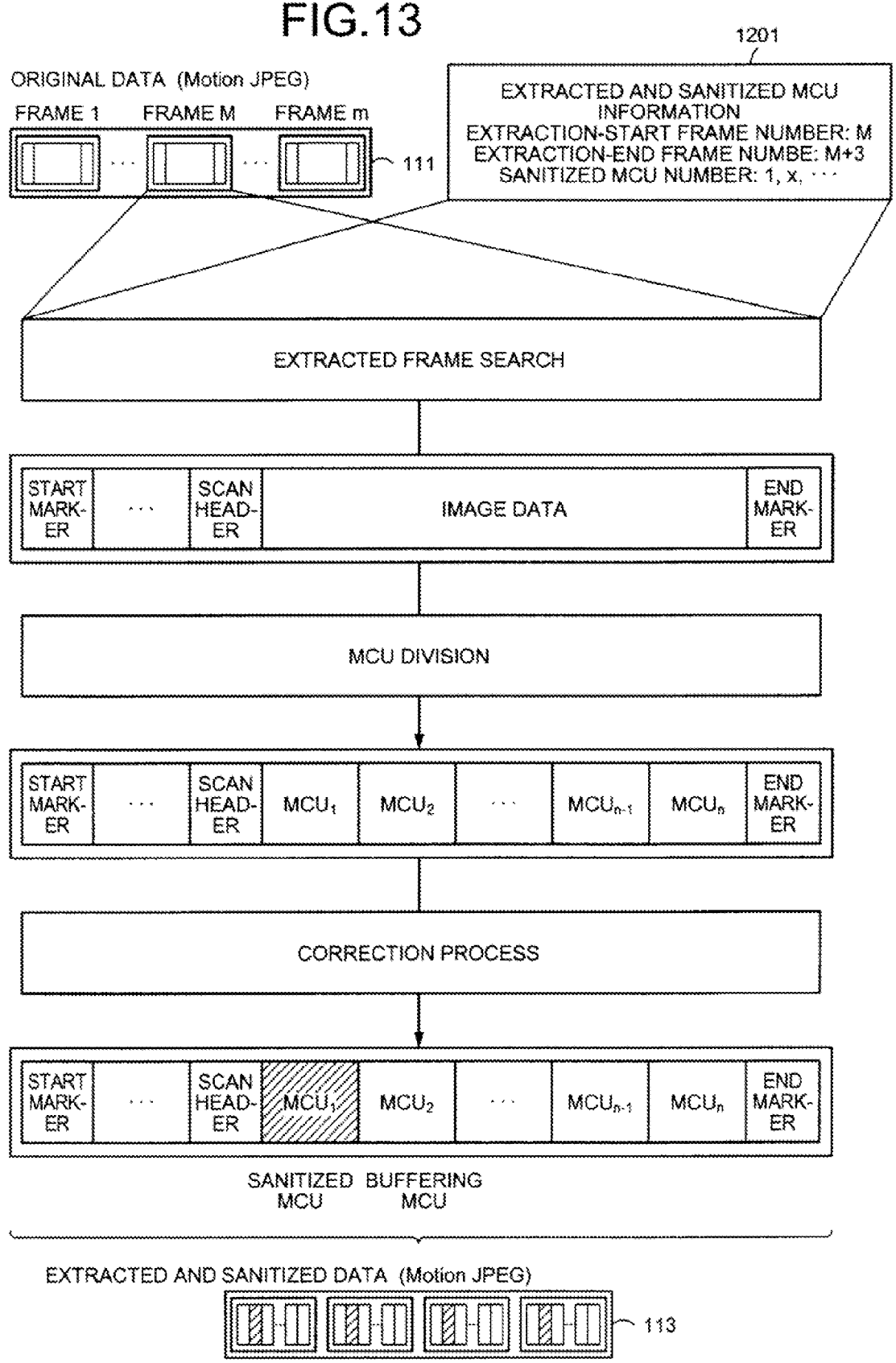
FIG. 13 is an explanatory diagram depicting an example of an extraction and sanitization process.

FIG. 13 is an explanatory diagram depicting an example of an extraction and sanitization process. First, the verification device 101 searches the extracted frames while referring to the extracted and sanitized MCU information 1201. The verification device 101 then obtains the frames M to M+1 as a search result, executes MCU division and performs a correction process on each of the MCUs. For example, the verification device 101 performs a predetermined correction process on each of the MCUs designated as the sanitized MCUs, and changes the differential values of the buffering MCUs so that the buffering MCUs have the same pixel values between after sanitization and before sanitization. The verification device 101 then outputs the Motion JPEG on which the correction process has been performed as the extracted and sanitized data 113. A calculation example of the sanitization process on each sanitized MCU and a working process on each buffering MCU is described later with reference to FIGS. 14A and 14B.

FIGS. 14A and 14B are explanatory diagrams depicting an example of calculating the pixel values of the sanitized MCUs and the buffering MCUs. First, FIG. 14A shows that the $MCU_2$ to $MCU_4$ are the sanitized MCUs and the $MCU_5$ is the buffering MCU among the $MCU_1$ to the $MCU_6$. Because the blocks within each MCU are identical to those depicted in FIG. 1, the blocks are not described herein.

FIG. 14B depicts the pixel values of each MCU before sanitization and after sanitization. For example, FIG. 14B depicts luminance components as the pixel values of the MCU and that luminance components are 0 when the MCU is sanitized.

A luminance DC (Direct-Current) component value is a value at an upper left position in the corresponding block in a frequency component obtained by performing DCT and quantization on the luminance in the pixel values of the block. Furthermore, a luminance DC differential value is a differential value from the frequency component of the block smaller by one in number. For example, the luminance DC differential value of the block 2 is the differential value from the luminance component value of the block 1, and the luminance DC differential value of the block 5 is the differential value from the luminance component value of the block 4. Moreover, a luminance AC (Alternating Current) component value is a value at positions other than the upper left position in the corresponding block obtained by performing DCT and quantization on the luminance in the pixel values of the block.

In the JPEG data, the top MCU has component values and the MCUs other than the top MCU have differential values. The verification device 101 is on the assumption of calculating and holding the DC component value of each MCU by performing the entropy decoding at a time of the MCU division.

First, as for the luminance component of the $MCU_1$, the component value and the differential value have no change between before sanitization and after sanitization because the $MCU_1$ is neither the sanitized MCU nor the buffering MCU. Next, as for the luminance component of the $MCU_2$, the verification device 101 changes the luminance DC component value of the block 5 to 0 and changes the luminance DC differential value denoted by reference numeral 1401 to the value calculated in the following equation (1) because the $MCU_2$ is the sanitized MCU.

(Luminance DC differential value of block within sanitized MCU)=(Luminance DC component value of block within sanitized MCU)-(Luminance DC component value of previous block   (1)

The equation (1) is an equation in which a sum between the luminance DC component value of one block and that of the previous block becomes black that indicates sanitization. For example, if being assigned to the equation (1), the luminance DC differential value of the block 5 becomes as follows.

(Luminance DC differential value of block 5)=(Luminance DC component value of block 5)-(Luminance DC component value of block 4)⇔ (Luminance DC differential value of block 5)=0−100=−100

Furthermore, the verification device 101 changes the luminance AC component value of the sanitized MCU denoted by reference numeral 1402 to 0 that is a value indicating black designated by the luminance DC component value after sanitization. Moreover, as for the luminance component of the $MCU_5$, the verification device 101 changes a luminance DC differential value denoted by reference numeral 1403 to a value calculated by the following equation (2) because the $MCU_5$ is the buffering MCU.

(Luminance DC differential value of block within buffering MCU)=(Luminance DC component value of block within buffering MCU)-(Luminance DC component value of previous block within buffering MCU)   (2)

The equation (2) is an equation of replacing the sanitized MCU in the equation (1) by the buffering MCU. For example, a luminance DC differential value of a block 17 is expressed as follows if being assigned to the equation (2).

p (Luminance DC differential value of block 17)= (Luminance DC component value of block 17)- (Luminance DC component value of block 16)
⇔ (Luminance DC differential value of block 17)=75−0=75

While the luminance component value has been described with reference to FIGS. 14A and 14B, the verification device 101 uses a similar calculation method for the blue color-difference component value and the red color-difference component value.

FIG. 15 is an explanatory diagram depicting an example of verifying the extracted and sanitized data. The verification device 101 acquires the first frame from the Motion JPEG that serves as the extracted and sanitized data 113, and generates the hashes of the respective MCUs as a process (1) in a process of verifying the extracted and sanitized data 113. At this time, the verification device 101 acquires the MCU final hashes stored in the MCU-hash storage data 123 for the respective MCUs while referring to the extracted and sanitized MCU and buffering MCU information 1202 when the target MCU is either the sanitized MCU or the buffering MCU.

For example, the $MCU_1$ and the $MCU_2$ in the frame M depicted in FIG. 15 are the sanitized MCU and the buffering MCU, respectively. Accordingly, the verification device 101 acquires the $MCU_1$ final hash and the $MCU_2$ final hash from the MCU-hash storage data 123. Furthermore, because the $MCU_{n-1}$ is neither the sanitized MCU nor the buffering MCU, the verification device 101 generates an $MCU_{n-1}$ temporary hash from the $MCU_{n-1}$ within the acquired frame. The verification device 101 then generates the $MCU_{n-1}$ final hash from the JPEG header hash in the MCU-hash storage data 123 and the generated $MCU_{n-1}$ temporary hash.

The verification device 101 completed with selecting or generating the respective MCU final hashes sets the data in which the JPEG header hash is linked to each of the MCU final hashes to the JPEG-frame-hash target data 124. The verification device 101 then calculates the hash for the JPEG-frame-hash target data 124 and generates the JPEG frame M hash.

Next, as a process (2) in the process of verifying the sanitized JPEG, the verification device 101 compares the JPEG frame M hash stored in the original signature data 431 with the generated JPEG frame M hash, and verifies whether the JPEG frame M has been tampered with.

As a method of determining whether the target MCU is the sanitized MCU or the buffering MCU, the verification device 101 makes a determination while referring to the extracted and sanitized MCU and buffering MCU information 1202. As another determination method, the verification device 101 can make determination based on, for example, the pixel values of the target MCU in the extracted and sanitized data 113. For example, when the pixel values of the target MCU are all 0 indicating black by the sanitization, the verification device 101 can detect the target MCU as the sanitized MCU and identify the MCU next to the target MCU as the buffering MCU.

Alternatively, the verification device 101 can determine whether the sanitized MCU and the buffering MCU stored in the extracted and sanitized MCU and buffering MCU information 1202 match the sanitized MCU detected based on the pixel values of the target MCU in the extracted and sanitized data 113 and the identified buffering MCU, respectively. When determining that the MCUs do not match, the verification device 101 outputs the determination result that the extracted and sanitized data 113 has been tampered with.

With reference to FIGS. 16 to 20-2, a flowchart of a signature generation process, the extraction and sanitization process, an MCU hash generation process, an MCU correction process, and an extracted and sanitized verification process executed by the verification device 101 is described. The MCU hash generation process and the MCU correction process are called from the extraction and sanitization process.

The verification device 101 executes the signature generation process when, for example, receiving the Motion JPEG serving as the original data 111 from the imaging device 201. The verification device 101 executes the extraction and sanitization process when receiving the extraction and sanitized MCU information 1201 from the extraction and sanitization operation terminal 202. As a preparation process for the extraction and sanitization process, the verification device 101 can transmit the original data 111 to the extraction and sanitization operation terminal 202, the extraction and sanitization operation terminal 202 can display the original data so as to facilitate instructing the extraction position and the sanitization position. The verification device 101 executes the extracted and sanitized data verification process when receiving the extracted and sanitized data 113 from the verification operation terminal 203.

FIG. 16 is a flowchart depicting an example of the signature generation process. The verification device 101 reads the Motion JPEG serving as the original data 111 (step S1601). The verification device 101 selects the first frame from the Motion JPEG (step S1602), and separates the selected frame into the JPEG header part and the JPEG data part (step S1603). The verification device 101 entropy-decodes the JPEG data part (step S1604). Note that the verification device 101 calculates DC component values of the respective MCUs by the entropy decoding and holds the calculated DC component values.

The verification device 101 generates the JPEG header hash from the JPEG header part (step S1605). The verification device 101 selects the first MCU (step S1606), and generates the MCU temporary hash from the selected MCU (step S1607). The verification device 101 generates the MCU final hash from the JPEG header hash and the MCU temporary hash (step S1608).

The verification device 101 determines whether the MCU final hashes have been generated for all the MCUs (step S1609). If a MCU is present for which the MCU final hash has not been generated yet (step S1609: NO), the verification device 101 selects the next MCU (step S1610), and proceeds to a process at step S1607.

If all the MCU final hashes have been generated (step S109: YES), the verification device 101 generates the JPEG frame hash from the JPEG-frame-hash target data 122 in which the JPEG header hash is linked to each of the MCU final hashes (step S1611). The verification device 101 determines whether the JPEG frame hashes have been generated for all the frames (step S1612). If the JPEG frame hashes have not been generated for all the frames yet (step S1612: NO), the verification device 101 proceeds to a process at step S1613.

If the JPEG frame hashes have been generated for all the frames (step S1612: YES), the verification device 101 generates the original signature data 431 from the signature header 501 and each of the JPEG frame hashes (step S1614), and ends the signature generation process.

FIGS. 17A and 17B are flowcharts depicting an example of the extraction and sanitization process. First, the verification device 101 reads the extracted and sanitized information (step S1701). Next, the verification device 101 identifies the buffering MCU from the designated sanitized MCU (step S1702). The verification device 101 reads the Motion JPEG serving as the original data 111 (step S1703). The verification device 101 selects the first frame from the Motion JPEG serving as the original data 111 (step S1704).

The verification device 101 determines whether the selected frame is the extracted data (step S1705). As a method of determining whether the selected frame is the extracted data, the verification device 101 determines that the selected frame is the extracted data if the frame number of the selected frame is equal to or higher than the extraction-start frame number of the extracted and sanitized MCU information 1201 and equal to or lower than the extraction-end frame number thereof. If the selected frame is the extracted data (step S1705: YES), the verification device 101 separates the selected frame into the JPEG header part and the JPEG data part (step S1706), and entropy-decodes the JPEG data part (step S1707). Note that the verification device 101 calculates and holds the DC component values of the respective MCUs by the entropy-decoding.

The verification device 101 selects the first MCU (step S1708), and executes the MCU hash generation process on the selected MCU (step S1709). The MCU hash generation process is described later in detail with reference to FIG. 18. After executing the MCU hash generation process, the verification device 101 determines whether the MCU hash generation process has been executed for all the MCUs (step S1710). If the MCU for which the MCU hash generation process is not executed yet is present (Step 1710: NO), the verification device 101 selects the next MCU (step S1711) and proceeds to the process at step S1709.

If the MCU hash generation process has been executed for all the MCUs (step S1710: YES), the verification device 101 determines whether it has been determined for all the frames, whether the frame is extracted data (step S1712). If a frame is present for which it has not been determined whether the frame is the extracted data (step S1712: NO) or if a frame that is not the extracted data is present (step S1705: NO), the verification device 101 selects the next frame (step S1713), and proceeds to a process at step S1713. If it has been determined for all the frames whether the frame is the extracted frame (step S1712: YES), the verification device 101 proceeds to a process at step S1714 depicted in FIG. 17B.

With reference to FIG. 17B, when YES at step S1712, the verification device 101 selects the first frame from the Motion JPEG serving as the original data 111 (step S1714), and determines whether the selected frame is the extracted data (step S1715). If the selected frame is the extracted data (step S1715: YES), the verification device 101 separates the selected frame into the JPEG header part and the JPEG data part (step S1716), and entropy-decodes the JPEG data part (step S1717). Note that the verification device 101 calculates and holds the DC component values of the respective MCUs by the entropy-decoding.

The verification device 101 selects the first MCU (step S1718), and determines if the selected MCU is the sanitized MCU or the buffering MCU (step S1719). If the selected MCU is the sanitized MCU (step S1719: YES), the verification device executes the MCU correction process (step S1720). The MCU correction process is described later in detail with reference to FIG. 19. After the end of the MCU correction process or if the selected MCU is neither the sanitized MCU nor the buffering MCU (step S1719: NO), the verification device 101 determines whether the process has been performed on all of the MCUs (step S1721). The process depicted at step S1721 is the process at step S1719.

If an MCU on which the process has not been executed is present (step S1721: YES), the verification device selects the next MCU (step S1722) and proceeds to a process at step S1719. If the process has been executed on all of the MCUs (step S1721: YES), the verification device outputs the selected frame as the extracted and sanitized data 113 (step S1723). The verification device 101 determines whether it has been determined for all the frames whether the frame is the extracted data (step S1724).

If a frame is present for which it has not been determined whether the frame is the extracted data (step S1724: NO) or if a frame is not the extracted data (step S1715: NO), the verification device 101 selects the next frame (step S1725) and proceeds to the process at step S1715. If it has been determined for all of the frames whether the frame is the extracted data (step S1725: YES), the verification device 101 ends the extraction and sanitization process.

As for the position information of the sanitized MCU, the verification device 101 can add the extracted and sanitized MCU information 1201 to the MCU-hash storage data 123 when it is YES at step S1712, for example. Alternatively, the verification device 101 can perform the process within the MCU hash generation process. An example of the latter case is described with reference to FIG. 18.

FIG. 18 is a flowchart depicting an example of the MCU hash generation process. The verification device 101 determines if the selected MCU is the sanitized MCU or the buffering MCU (step S1801). If the selected MCU is neither the sanitized MCU nor the buffering MCU (step S1801: NO), the verification device 101 ends the MCU hash generation process.

If the selected MCU is either the sanitized MCU or the buffering MCU (step S1801: YES), the verification device 101 generates the JPEG header hash from the JPEG header part (step S1802), and generates the MCU temporary hash from the selected MCU (step S1803). Next, the verification device 101 generates the MCU final hash from the JPEG header hash and the MCU temporary hash (step S1804). The verification device 101 stores the MCU final hash in the MCU-hash storage data 123 (step S1805).

The verification device 101 adds the MCU number of the selected MCU to the extracted and sanitized MCU and buffering MCU information 1202 within the MCU-hash storage data 123 (step S1806), and ends the MCU hash generation process. Note that the verification device 101 adds the MCU number of the selected MCU to the sanitized MCU number field when the selected MCU is the sanitized MCU, and adds the MCU number of the selected MCU to the buffering MCU number field when the selected MCU is the buffering MCU.

As for the generation of the JPEG header hash depicted in a process at step S1802, the JPEG header hash is generated to have the same value irrespective of the MCU. Therefore, the verification device 101 can perform the process at step S1802 after step S1716 or step S1717.

As for the position information of the sanitized MCU, the verification device 101 can add a process of adding the MCU number in front of or in rear of the MCU final hash, for example, after a process at step S1804.

FIG. 19 is a flowchart depicting an example of the MCU correction process. The verification device 101 checks the type of the selected MCU (step S1901). If the selected MCU is the sanitized MCU (step S1901: sanitized MCU), the verification device 101 executes a predetermined correction process on the selected MCU (step S1902). The sanitization process, the pixelization, or the blurring process can be performed as the predetermined process.

Furthermore, the extraction and sanitization operation terminal 202 can perform a process at step S1902. In this case, after step S1901: sanitized MCU, the verification device 101 transmits the correction permission notification to the extraction and sanitization operation terminal 202, and the extraction and sanitization operation terminal 202 executes the predetermined correction process on the selected MCU. After the end of the process, the extraction and sanitization operation terminal 202 transmits edited pixel values to the verification device 101. After the end of execution of the correction process, the verification device 101 changes the DC differential values of the blocks within the selected MCU to ((DC component values of the blocks within the selected MCU)-(DC component values of the previous blocks)) (step S1903). After the change, the verification device 101 ends the MCU correction process.

If the selected MCU is the buffering MCU (step S1901: Buffering MCU), the verification device 101 changes the DC differential values of the blocks within the selected MCU to ((DC component values of the blocks within the selected MCU)-(DC component values of the previous blocks)) (step S1904), and ends the MCU correction process.

FIGS. 20A, 20B, and 20C are flowcharts depicting an example of the extracted and sanitized data verification process. First, in FIG. 20A, the verification device 201 reads the original signature data 431 (step S2001). The verification device 101 reads the MCU-hash storage data 123 (step S2002). The verification device 101 receives the Motion JPEG that is the verification subject and the extracted and sanitized data 113 (step S2003).

The verification device 101 selects the first frame from the Motion JPEG that is the extracted and sanitized data 113 (step S2004), and separates the selected frame into the JPEG header part and the JPEG data part (step S2005). The verification device 101 entropy-decodes the JPEG data part (step S2006). Note that the verification device 101 calculates the DC component value of each MCU by the entropy-decoding and holds the calculated DC component value. The verification device 101 extracts the JPEG header hash from the MCU-hash storage data (step S2007). The verification device 101 selects the first MCU (step S2008) and proceeds to a process at step S2009 depicted in FIG. 20B.

Next, as depicted in FIG. 20B, the verification device 101 determines whether the pixel values of the selected MCU in the selected frame are predetermined pixel values (step S2009). If the pixel values are the predetermined pixel values (step S2009: YES), the verification device 101 detects the selected MCU as the sanitized MCU (step S2010). The verification device 101 acquires a smallest number among non-acquired numbers from the sanitized MCU number field of the extracted and sanitized MCU and buffering MCU information 1202 (step S2011). In a process at step S2011, when the sanitized MCU number field is in the state depicted in FIG. 12, the verification device 101 acquires "1" in a first process and acquires "x" in a second process because the verification device 101 already acquired "1".

If the pixel values of the selected MCU in the selected frame are not the predetermined pixel values (step S2009: NO), the verification device 101 determines whether the previous MCU that is one MCU before the selected MCU has been detected as the sanitized MCU (step S2012). If the previous MCU has been detected as the sanitized MCU (step S2012: YES), the verification device 101 identifies the selected MCU as the buffering MCU (step S2013). The verification device 101 acquires the smallest number of all the non-acquired numbers from the buffering MCU number field of the extracted and sanitized MCU and buffering MCU information 1202 (step S2014). In a process at step S2014, if the buffering MCU number field is in a state depicted in FIG. 12, the verification device 101 acquires "2" in the first process and acquires "x+1" in the second process because the verification device 101 already acquired "2".

After the end of a process at step S2011 or 52104, the verification device 101 determines whether the acquired number matches the number of the selected MCU (step S2015). If non-acquired numbers are not present at step S2011 or S2014, the verification device 101 executes a process at step S2015: NO. If the acquired number matches the number of the selected MCU (step S2015: YES), the verification device 101 acquires the MCU final hash corresponding to the selected MCU from the MCU-hash storage data (step S2016).

If the previous MCU has not been detected as the sanitized MCU (step S2012: NO), the verification device 101 generates the MCU temporary hash from the selected MCU (step S2017). The verification device 101 generates the MCU final hash from the extracted JPEG header hash and the MCU temporary hash (step S2018). After the end of a process at step S2016 or step S2018, the verification device 101 determines whether the process has been performed on all the MCUs (step S2019). Note that the process depicted at step S2019 is the process at step S2009. If a MCU on which the process has not been performed is present (step S2019: NO), the verification device 101 selects the next MCU (step S2020) and proceeds to the process at step S2009.

If the process has been performed on all of the MCUs (step S2019: YES), the verification device 101 determines whether the MCU numbers of unprocessed MUCs are present in the sanitized MCU number field and the buffering MCU number field of the extracted and sanitized MCU and buffering MCU information 1202 (step S2021). If the acquired number does not match the MCU number of the selected MCU (step S2015: NO) or the MCU number of an unprocessed MCU is present (step S2021: YES), the verification device 101 outputs the verification result indicating that the extracted and sanitized data has been tampered with (step S2022). After outputting the result, the verification device 101 ends the verification process. If the MCU number of an unprocessed MCU is not present (step S2021: NO), the verification device 101 proceeds to a process at step S2023 depicted in FIG. 20B.

Examples of a case of "NO" at step S2015 include a case where the MCU that is newly sanitized by a malicious third party is present among the MCUs in the extracted and sanitized data 113. In this case, the verification device 101 detects the newly sanitized MCU in the process at step S2010; however, the MCU number of the newly sanitized MCU is not stored in the sanitized MCU number field. Accordingly, the verification device 101 executes the process of "NO" at step S2015.

Moreover, the examples of the case of "NO" at step S2015 include a case where the sanitized MCU among the MCUs of the extracted and sanitized data 113 has been tampered with by a malicious third party. For example, with reference to the example of FIG. 1, the $MCU_1$ of the extracted and sanitized data 113 is replaced by someone else. At a time point when the selected MCU is the $MCU_1$, the verification device 101 executes "NO" at step S2012. When the selected MCU becomes the sanitized MCU as a result of selecting the next MCU, the verification device 101 acquires "1" as the MCU number of the sanitized MCU at step S2011, determines that the acquired number does not match the MCU number of the selected MCU, and executes "NO" at step S2015.

Even if the selected MCU is not the sanitized MCU and the verification device 101 executes "YES" at step S2019, a non-acquired MCU number is present in the sanitized MCU number field. The verification device 101, therefore executes "YES" at step S2021 and can detect the tampering.

Moreover, even if the buffering MCU among the MCUs in the extracted and sanitized data 113 has been sanitized by the malicious third party, the verification device 101 executes "NO" at step S2015. For example, when the buffering MCU has been sanitized, the verification device 101 executes "YES" at step S2009; however, the MCU number of the buffering MCU is not stored in the sanitized MCU number field, and the verification device 101, therefore executes "NO" at step S2015.

Finally, as depicted in FIG. 20C, if the MCU number of an unprocessed MCU is not present (step S2021: NO), the verification device 101 generates the JPEG frame hash from the JPEG-frame-hash target data 124 in which the JPEG header hash is linked to each of the MCU final hashes (step S2023). Next, the verification device 101 compares the generated JPEG frame hash with the JPEG frame hash corresponding to the selected frame within the original signature data (step S2024). The verification device 101 determines whether a comparison result indicates that the JPEG frame hashes match each other (step S2025).

If the JPEG frame hashes match each other (step S2025: YES), the verification device 101 determines whether a comparison has been made for all of the frames of the extracted and sanitized data 113 (step S2026). The comparison referred to at step S2026 is a process at step S2024. If a frame for which the comparison has not been made yet is present (step S2026: NO), the verification device 101 selects the next frame (step S2027), and proceeds to a process at step S2005. If the comparison has been made for all of the frames (step S2026:

YES), the verification device 101 outputs the verification result indicating the authenticity of the originality of the extracted and sanitized data 113, i.e., the extracted and sanitized data 113 has not been tampered with is verified (step S2029), and ends the verification process.

As described above, according to the verification method, the verification device, and the verification program, the hashes of the verification subject image are generated for the sanitized MCU and the buffering MCU identified from the sanitized MCU within the verification subject image, using the hashes of the before-correction MCUs at the same positions within the original image.

The verification device can thereby perform verification by making a comparison once between the hashes of the verification subject image including multiple verified sanitized areas and those of the original image, and perform the verification promptly. Furthermore, the verification device executes a hash function with respect to the digest target in which the hashes of the areas obtained by dividing the original image and the verification subject image are linked, generates the hash of the original image and the verification subject image, and compares the hashes. Alternatively, the verification device can perform verification by comparing the digest target in which the hashes of the respective areas are linked of the original image with that of the verification subject image. In this alternative, the verification device can perform verification promptly because, as for the digest target in which the hashes of the areas are linked and the hashes generated from the digest information, the latter is smaller in data size and shorter in time for the comparison than the former.

Moreover, the verification device can determine the MCU having specific pixel values as the sanitized MCU, the MCU identified from the sanitized MCU as the buffering MCU, and the area of the sanitized MCU and the identified buffering MCU as the MCUs using the hashes of the original among areas obtained by dividing the verification subject image. With this configuration, when a malicious third party manipulates the sanitized MCU of the verification subject image, the hashes do not match those of the original and detects the tampering because the verification device uses the hashes generated from the MCUs of the verification subject image without using the hashes of the original. In this way, even if the sanitized MCU has been tampered with, the verification device can detect the tampering. Furthermore, because the presence of the tampering matches the verification result, it is possible to improve verification accuracy for verifying the originality. The verification accuracy indicates a rate of matching between the presence of the tampering and the verification result.

Furthermore, the verification device can determine whether the sanitized MCU stored in the storage area is present at the same position as that of the sanitized MCU having the specific pixel values, and whether the buffering MCU stored in the storage area is present at the same position as that of the buffering MCU identified from the sanitized MC. With this configuration, when a malicious third party manipulates the MCU other than the sanitized MCU and the buffering MCU, the verification device can determine the tampering without generating the hashes of the verification subject image from the hash of each MCU. Therefore, the verification device can promptly perform verification. Because the hash generation process is large in processing amount, the verification device can provide a verifier with a verification result more promptly when obtaining the verification result without generating any hashes.

Moreover, the verification device can authenticate the originality for multimedia data, and can certify that evidentiality is held for stream data obtained by extracting and processing important scenes of a video such as surveillance images taken by the imaging device for which importance is put on the evidentiality. Furthermore, the verification device can detect tampering when the JPEG header part has been tampered with because the verification device generates the hashes including those of the JPEG header part.

The verification method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to one aspect of the present invention, the originality of images in which a part of the images has been sanitized according to an image compression format can be promptly verified.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A verification method executed by a computer, the verification method comprising:
receiving a first image that is a verification subject;
acquiring for third and fourth areas that are at positions identical to positions of first and second areas and are among a plurality of areas obtained by dividing the first image, digest information of the first and second areas before correction, the digest information being acquired from a first storage unit that stores the digest information of the first area before correction, position information of the first area that is a correction target among a plurality of areas obtained by dividing a second image that is an original, and the digest information of the second area before correction, the second area being identified based on the position information of the first area;
generating digest information for other areas different from the third and fourth areas and among the areas obtained by dividing the first image;
generating digest information for the first image from a digest target linked to the acquired digest information and to the generated digest information according to position information of areas that are among the areas obtained by dividing the first area and that correspond to the acquired digest information and the generated digest information; and
reading digest information from a second storage area storing digest information generated from a digest target linked, according to position information of the areas obtained by dividing the second image, to digest information of the areas obtained by dividing the second image, and verifying authenticity of the first image by comparing the read digest information and the digest information generated for the first image.

2. The verification method according to claim 1, further comprising:
- detecting the third area among the areas obtained by dividing the first image and for which pixel values are specific pixel values; and
- identifying the fourth area among the areas obtained by dividing the first image and for which pixel values are expressed by differential values from the pixel values of the third area, wherein
- the acquiring of the digest information includes acquiring from the first storage unit and for the detected third area and the identified fourth area among the areas obtained by dividing the first image, the digest information for the first and second areas before the correction, the first and second areas being at positions identical to positions of the third and fourth areas.

3. The verification method according to claim 2, further comprising determining whether the first area at the same position as the third area is present and the second area at the same position as the fourth area are present when the fourth area is identified, wherein
- the verifying includes verifying the authenticity of the first image by using a determination result and a comparison result of comparing the digest information for the first image and the read digest information.

4. A verification device comprising:
- a first storage unit that stores position information of a first area that is a correction target among a plurality of areas obtained by dividing a second image that is an original, digest information for the first area before correction, and the digest information for a second area before correction, the second area identified based on the position information of the first area;
- a second storage unit that stores digest information generated from a digest target linked, according to position information of the areas obtained by dividing the second image, to digest information for the areas obtained by dividing the second image; and
- a processor configured to:
  - receive a first image that is a verification subject;
  - acquire from the first storage unit and for third and fourth areas that are at positions identical to positions of the first and second areas and are among a plurality of areas obtained by dividing the first image, digest information of the first and second areas before correction;
  - generate digest information for other areas different from the third and fourth areas and among the areas obtained by dividing the first image;
  - generate digest information for the first image from a digest target linked to the acquired digest information and to the generated digest information according to position information of areas that are among the areas obtained by dividing the first area and that correspond to the acquired digest information and the generated digest information; and
  - read the digest information from the second storage unit, and verify authenticity of the first image by comparing the read digest information and the digest information generated for the first image.

5. A non-transitory, computer-readable recording medium storing a program causing a computer to execute a verification process comprising:
- receiving a first image that is a verification subject;
- acquiring for third and fourth areas that are at positions identical to positions of first and second areas and are among a plurality of areas obtained by dividing the first image, digest information of the first and second areas before correction, the digest information being acquired from a first storage unit that stores the digest information of the first area before correction, position information of the first area that is a correction target among a plurality of areas obtained by dividing a second image that is an original, and the digest information of the second area before correction, the second area being identified based on the position information of the first area;
- generating digest information for other areas different from the third and fourth areas and among the areas obtained by dividing the first image;
- generating digest information for the first image from a digest target linked to the acquired digest information and to the generated digest information according to position information of areas that are among the areas obtained by dividing the first area and that correspond to the acquired digest information and the generated digest information; and
- reading digest information from a second storage area storing digest information generated from a digest target linked, according to position information of the areas obtained by dividing the second image, to digest information of the areas obtained by dividing the second image, and verifying authenticity of the first image by comparing the read digest information and the digest information generated for the first image.

* * * * *